United States Patent [19]

Mase et al.

[11] Patent Number: 5,491,777
[45] Date of Patent: Feb. 13, 1996

[54] IMAGE DATA PROCESSOR

[75] Inventors: Tomokazu Mase, Omiya; Yoshiyuki Murata, Ome; Masahito Ariizumi; Shinichiro Sato, both of Fussa, all of Japan

[73] Assignee: Casio Computer Co., Ltd., Tokyo, Japan

[21] Appl. No.: 148,975

[22] Filed: Nov. 8, 1993

[30] Foreign Application Priority Data

Dec. 14, 1992 [JP] Japan .................................. 4-332725
Dec. 28, 1992 [JP] Japan .................................. 4-349427
Dec. 30, 1992 [JP] Japan .................................. 4-360899

[51] Int. Cl.$^6$ ............................................. G06F 15/00
[52] U.S. Cl. ............................................. 395/133
[58] Field of Search ..................... 395/133, 155, 395/161, 152; 345/121, 122

[56] References Cited

U.S. PATENT DOCUMENTS 4,315,628  2/1982  Balash et al. .................. 273/296
5,111,409  5/1992  Gasper et al. .................. 395/152

FOREIGN PATENT DOCUMENTS 3-129572  6/1991  Japan .
3-193074  8/1991  Japan .

OTHER PUBLICATIONS

Rakover et al, "To Catch a Thief with a Recognition Test: the Model and same Empirical Results", Cognitive Psychology 21, 423–468 (1989).

Primary Examiner—Phu K. Nguyen
Attorney, Agent, or Firm—Frishauf, Holtz, Goodman, Langer & Chick

[57] ABSTRACT

An image data processor, for use in a device which plays a battle game, a congeniality divination game, etc., includes a designating unit which is operated to designate respective parts of objects in order to display those object images on a display. A determining unit determines superiority or inferiority between the respective displayed object images on the basis of scores corresponding to part images constituting the respective displayed object images. The respective object images are changed depending on the results of the determination and the resulting object images are then displayed on the display. When the designating unit designates any part of the object, a score corresponding to that portion is read out, and data on the appropriate object image is displayed on the display depending on the read out score. When the designating unit designates the respective parts of the object, the display displays a first object image composed of a combination of the part images corresponding to the respective parts of the object and a second object image congenial to the first object image.

30 Claims, 36 Drawing Sheets

FIG.3A

| PART \ NO. | | 01 | 02 | 03 | 04 | 20 | |
|---|---|---|---|---|---|---|---|
| CONTOUR | 1 | | | | | | — 33a |
| HAIR STYLE | 2 | | | | | | — 33a |
| EYES | 3 | | | | | | — 33a |
| NOSE | 4 | | | | | | — 33a |
| MOUTH | 5 | | | | | | — 33a |

FIG.3B

| PART \ NO. | | 01 | 02 | 03 | 04 | 20 | |
|---|---|---|---|---|---|---|---|
| FACE | 1 | | | | | | — 33b |
| TRUNK | 2 | | | | | | — 33b |
| BOTH ARMS & HANDS | 3 | | | | | | — 33b |
| BOTH LEGS | 4 | | | | | | — 33b |

| PART \ NO. | 01 | 02 | 03 | 04 | 05 | 20 | |
|---|---|---|---|---|---|---|---|
| CONTOUR | 0 | 7 | 6 | 5 | | 5 | ~34a |
| HAIR STYLE | 3 | 5 | 7 | 8 | | 6 | ~34a |
| EYES | 1 | 2 | 3 | 4 | | 5 | ~34a |
| NOSE | 4 | 3 | 5 | 7 | | 3 | ~34a |
| MOUTH | 1 | 8 | 9 | 2 | | 6 | ~34a |

| PART \ NO. | 01 | 02 | 19 | 20 | |
|---|---|---|---|---|---|
| FACE | 9 | 2 | 3 | 1 | ~34b |
| TRUNK | 3 | 6 | 6 | 9 | ~34b |
| BOTH ARMS &HANDS | 2 | 5 | 3 | 8 | ~34b |
| BOTH LEGS | 1 | 3 | 4 | 7 | ~34b |

FIG. 6A — 1ST INTERMEDIATE DISPLAY PATTERN

| PART \ No. | 01 | 02 | 03 | 04 | | 20 |
|---|---|---|---|---|---|---|
| EYES | | | | | | |
| MOUTH | | | | | | |

FIG. 6B — 2ND INTERMEDIATE DISPLAY PATTERN

| PART \ No. | 01 | 02 | 03 | 04 | | 20 |
|---|---|---|---|---|---|---|
| EYES | | | | | | |
| MOUTH | | | | | | |

FIG. 6C — VICTORY RESULT DISPLAY PATTERN

| PART \ No. | 01 | 02 | 03 | 04 | | 20 |
|---|---|---|---|---|---|---|
| EYES | | | | | | |
| MOUTH | | | | | | |
| ANOTHER | | | | | | |

FIG.7A

| PART \ NO. | 01 | 02 | 03 | 04 | | 20 | |
|---|---|---|---|---|---|---|---|
| CONGENIALITY COINCIDENCE (SCORE DIFFERENCE "0"~"3") RESULT DISPLAY PATTERN ||||||| ← 36 |
| EYES | ⌢ ⌢ | ◯ ◯ | - - | - - | | | — 36d |
| MOUTH | ⌒ | ⌣ | ⌣ | ⌣ | | | — 36d |
| OTHERS | ♡ ♡ ♡ | ★ ★ ★ ★ ★ | ♡ ♡ | ♡ ♡ ♡ | | | — 36d-1 |

FIG.7B

| PART \ NO. | 01 | 02 | 03 | 04 | | 20 | |
|---|---|---|---|---|---|---|---|
| DEFEAT RESULT-CONGENIALITY COINCIDENCE (SCORE DIFFERENCE "16" OR MORE) RESULT DISPLAY PATTERN ||||||| ← 36 |
| EYES | ◯ ◯ | ◯ ◯ | ╱╱ | ⌣ ⌣ | | | — 36e |
| MOUTH | ⌒ | ⌒ | ∧ | ~ | | | — 36e |
| OTHERS | ∥∥∥ | ★ ★ | ★ ★ | ◯ ◯ | | | — 36e-1 |

FIG.8A

| PART \ NO. | 01 | 02 | | 20 |
|---|---|---|---|---|
| VICTORY RESULT-CONGENIALITY COINCIDENCE (SCORE DIFFERENCE "0"~"3") RESULT DISPLAY PATTERN ||||| 36 |
| FACE | | | | | 36f |
| BOTH ARMS & BOTH HANDS | | | | | 36f |

FIG.8B

| PART \ NO. | 01 | 02 | | 20 |
|---|---|---|---|---|
| DEFEAT RESULT-CONGENIALITY COINCIDENCE (SCORE DIFFERENCE "0"~"3") RESULT DISPLAY PATTERN ||||| 36 |
| FACE | | | | | 36g |
| BOTH ARMS & BOTH HANDS | | | | | 36g |

FIG.9

| DECIDE | MESSAGE |
|---|---|
| VICTORY | I won. Wow! |
| DEFEAT | I lost. Sorry! |
| DRAW | Mmm ··· |

| SCORE DIFFERENCE | MESSAGE | |
|---|---|---|
| 0~3 | Perfectly congenial ! | I am delighted ! |
| 4~15 | Almost congenial ! | We'll be friends ! |
| 16~29 | Never congenial ! | We'll fight it out in a battle game ! |

| PART | PART PATTERN NO. | SCORE |
|---|---|---|
| CONTOUR | 01 | 0 |
| HAIR | 01 | 3 |
| EYES | 01 | 1 |
| NOSE | 02 | 3 |
| MOUTH | 01 | 1 |
| TOTAL SCORE | | 8 |

11a  11e  11c

Y  39

| PART | PART PATTERN NO. | SCORE |
|---|---|---|
| CONTOUR | 03 | 6 |
| HAIR | 20 | 6 |
| EYES | 02 | 2 |
| NOSE | 04 | 7 |
| MOUTH | 02 | 8 |
| TOTAL SCORE | | 29 |

| PART | PART PATTERN NO. | SCORE |
|---|---|---|
| FACE | 09 | 0 |
| TRUNK | 03 | 5 |
| BOTH ARMS & HANDS | 02 | 4 |
| BOTH LEGS | 01 | 3 |
| TOTAL SCORE | | 12 |

11A  11E  11C

Y  39

| PART | PART PATTERN NO. | SCORE |
|---|---|---|
| FACE | 07 | 5 |
| TRUNK | 09 | 6 |
| BOTH ARMS & HANDS | 08 | 2 |
| BOTH LEGS | 07 | 3 |
| TOTAL SCORE | | 16 |

| PART | PART PATTERN NO. | SCORE |
|---|---|---|
| CONTOUR | 02 | 7 |
| HAIR | 04 | 8 |
| EYES | 04 | 1 |
| NOSE | 03 | 7 |
| MOUTH | 04 | 2 |
| TOTAL SCORE | 25 | |

12a  12e  12c

Y

| PART | PART PATTERN NO. | SCORE |
|---|---|---|
| CONTOUR | 04 | 5 |
| HAIR | 03 | 6 |
| EYES | 03 | 3 |
| NOSE | 01 | 3 |
| MOUTH | 03 | 4 |
| TOTAL SCORE | 21 | |

| PART | PART PATTERN NO. | SCORE |
|---|---|---|
| FACE | 02 | 1 |
| TRUNK | 06 | 2 |
| BOTH ARMS &HANDS | 09 | 3 |
| BOTH LEGS | 05 | 2 |
| TOTAL SCORE | 8 | |

12A  12E  12C

Y

| PART | PART PATTERN NO. | SCORE |
|---|---|---|
| FACE | 04 | 0 |
| TRUNK | 08 | 0 |
| BOTH ARMS &HANDS | 02 | 1 |
| BOTH LEGS | 01 | 2 |
| TOTAL SCORE | 3 | |

| THE OTHER PARTNER / ONE PARTNER | ROUND | ELLIPTIC | SQUARE | SLENDER | HOME BASE | MIXED | INVERTED-TRIANGULAR |
|---|---|---|---|---|---|---|---|
| ROUND | ◎ | ◎ | ×× | △ | △ | × | × |
| ELLIPTIC | ◎ | ○ | × | ○ | △ | △ | ◎ |
| SQUARE | ×× | × | ×× | ◎ | ○ | ○ | △ |
| SLENDER | △ | ○ | ◎ | △ | × | × | ○ |
| HOME BASE | △ | △ | ○ | × | ×× | ×× | × |
| MIXED | × | △ | ○ | × | ×× | × | × |
| INVERTED-TRIANGULAR | × | ◎ | △ | ○ | × | × | ×× |

DEGREE OF CONGENIALITY: ◎, ○ = 0~3 ; △ = 4~15 ; ×, ×× = 16~

| NO.<br>PART | 01 | | | 02 | | | 03 | | | |
|---|---|---|---|---|---|---|---|---|---|---|
| | A | B | C | A | B | C | A | B | C | A |
| 1 | 5 | 3 | 2 | 4 | 4 | 3 | 2 | 5 | 5 | 2 |
| 2 | 4 | 1 | 4 | 3 | 3 | 4 | 4 | 2 | 5 | 3 |
| 3 | 3 | 4 | 2 | 3 | 2 | 5 | 4 | 2 | 1 | 4 |
| | | | | | | | | | | |

A : LUCK IN WORK
B : LUCK IN LOVE
C : LUCK IN MONEY

| SCORE | CONTENTS OF MESSAGE<br>(LUCK IN WORK) |
|---|---|
| 5~10 | YOU MUST MAKE TWICE<br>AS MANY EFFORTS AS OTHERS |
| 11~20 | LUCK IS IMPROVING |
| 21~25 | FAVORABLE |

[LUCK IN WORK]
FAVORABLE
[LUCK IN LIVE]
BEST
[LUCK IN MONEY]
GOOD

FIG.34A

| PART \ NO. | | 01 | 02 | 03 | | 49 | 50 |
|---|---|---|---|---|---|---|---|
| CONTOUR | 1 | | | | | | |
| HAIR STYLE | 2 | | | | | | |
| EYES | 3 | | | | | | |
| NOSE | 4 | | | | | | |
| MOUTH | 5 | | | | | | |
| | | | | | | | |
| BOTH LEGS | 10 | | | | | | |

FIG.34B

| | PART PATTERN NO. | CONGENIAL PART PATTERN NO. | PART PATTERN NO. | CONGENIAL PART PATTERN NO. | PART PATTERN NO. | CONGENIAL PART PATTERN NO. |
|---|---|---|---|---|---|---|
| CONTOUR | 01 | 03 | 49 | 02 | 50 | 07 |
| HAIR STYLE | 01 | 05 | 49 | 02 | 50 | 03 |
| EYES | 01 | 08 | 49 | 05 | 50 | 07 |
| NOSE | 01 | 07 | 49 | 01 | 50 | 05 |
| MOUTH | 01 | 10 | 49 | 01 | 50 | 06 |
| BOTH LEGS | 01 | 27 | 49 | 03 | 50 | 05 |

FIG.35A

| PART\INDI-VIDUAL | CONTOUR | HAIR STYLE | EYES | NOSE | MOUTH | BOTH LEGS |
|---|---|---|---|---|---|---|
| X | 02 | 02 | 01 | 01 | 01 | 05 |
| Y | 05 | 06 | 07 | 08 | 09 | 30 |
| Z | 09 | 10 | 11 | 09 | 10 | 05 |

61A-1

GP1, GP2, GPn

IMAGE DATA PROCESSOR

BACKGROUND OF THE INVENTION

The present invention relates to image data processors for use in playing a battle game or a congeniality divination game, using data on the images of objects such as a plurality of human beings, animals or buildings.

Various game devices using electronic units have been developed and available commercially. For example, a battle type television game device is known which uses a television display screen. In this device, game program data stored in a dedicated cassette provided to the device body is read out in accordance with an keying-in operation, and a person displayed on the display screen is moved in accordance with the game program data to decide victory or defeat of the game.

With this television game device, however, the data on the basis of which victory or defeat of the game is decided is set beforehand as the program in the dedicated cassette. Thus, the result of victory or defeat of the game is fixed and as a result the game is not so interesting.

A competing type game device to which the users themselves input data which is the base of decision of victory or defeat is known as a bar code battle device, as disclosed in published unexamined Japanese patent application Hei 3-193074. In this device, when two kinds of bar code cards are inserted into the device body, a bar code data reader provided in the device body reads the bar code data printed on the two cards, and the device converts the read data items to numerical values. The device compares the numerical values to decide victory or defeat depending on which value is larger, and displays the result of the decision in numerical values and symbols.

With this bar code battle device, the data on the basis of which victory or defeat is decided is input by the users themselves, and the data obtained on the basis of the input bar code data is numerical data. Thus, the game itself is not interesting.

Apart from the battle type game device, a congeniality diagnosis device is known. In this device, the blood types and asterism names of the two persons who are subjected to congeniality divination are input to the device, and the congeniality of the two persons is decided in accordance with a combination of the input data items on the respective blood type and asterism names.

Also, with this congeniality divination device, the input data is limited to the blood types and asterism names of the two persons, so that even when the person who is subjected to the divination has been exchanged with another, the same result of congeniality divination can appear. Thus, the game is not interesting.

The present invention has been made in view of those problems. It is therefore an object of the present invention to provide an image data processor useful for various game devices such as battle games and congeniality divination games.

In order to achieve the above object, the inventive image data processor includes setting means for setting a plurality of object image data items each including a combination of part image data items corresponding to the respective parts of an object, determining means for determining superiority or inferiority between the plurality of image data items set by the setting means on the basis of the part image data items constituting the respective object image data items, and display means for displaying the result of the determination by the determining means. The display means is, for example, liquid crystal display means or printing means for displaying visually the data on the result of the determination.

According to the present invention, the setting means sets a plurality of object image data items each including a combination of part image data items corresponding to the respective parts of an object. The determining means determines superiority or inferiority between the plurality of object image data items set by the setting means on the basis of the part image data items composing the respective object image data items. The display displays the result of the determination by the determining means. Thus, the result of determination about superiority or inferiority between the plurality of object image data items is displayed on a display or in print.

BRIEF DESCRIPTION OF THE DRAWINGS

FIG. 3A shows a stored state of basic part patterns of face montages in a basic part pattern ROM;

FIG. 3B shows a stored state of basic part patterns of whole body montages in the basic part pattern ROM;

FIGS. 6A–6C each show a stored state of face expression patterns in an expression part pattern ROM;

FIGS. 7A and 7B each show a stored state of face expression patterns in the expression part pattern ROM;

FIGS. 8A and 8B each show a stored state of main portions of the whole body expression patterns in the expression part pattern ROM;

FIG. 9 shows a stored state of battle victory/defeat messages in a battle message ROM;

FIG. 10 shows a stored state of congeniality message in a congeniality message ROM;

FIGS. 11A and 11B each show a stored state of the numbers of the part patterns, etc., which constitute battle montage data entered in a battle montage RAM;

FIGS. 12A and 12B each show a stored state of the part pattern numbers which constitute congeniality divination montage data entered in a congeniality divination montage RAM;

FIG. 21 shows data stored in a face type congeniality corresponding ROM used in a second embodiment of the present invention;

FIG. 34A shows a stored state of part patterns in a basic part pattern ROM of a ROM assembly;

FIG. 34B shows a stored state of part and congenial pattern numbers in a self-congeniality correspondence ROM of a ROM assembly;

FIG. 35A shows a stored state of part pattern number groups in an entry montage RAM of a RAM assembly;

DESCRIPTION OF THE PREFERRED EMBODIMENTS

Embodiments of the present invention will be described below with respect to the drawings.

[First Embodiment]

Figure 1:
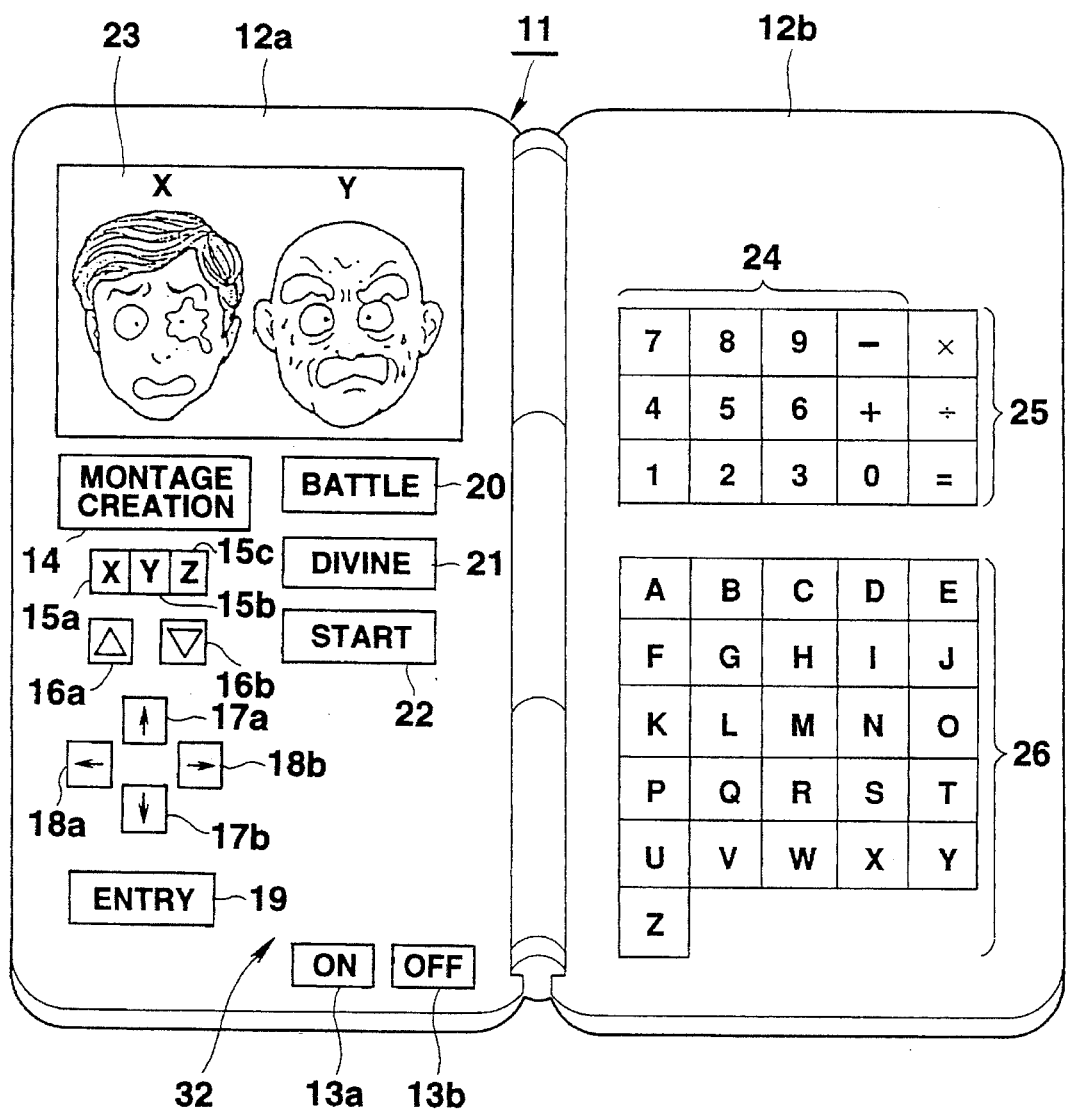
FIG. 1 shows the composition of an internal surface of a montage game device as a first embodiment of the present invention and taken when unfolded.

FIGS. 1–20C involve a montage game device as a first embodiment of the present invention. In FIG. 1, the game device body 11 is provided with a pocketable type casing having right and left halves openable right and left. The left half has an operation surface 12a which is provided thereon with an ON key 13a and an OFF key 13b which turn on and off a power supply (not shown) to the device; a montage creating key 14 operated when a montage is created; X, Y and Z keys 15a, 15b and 15c depressed to designate respectively persons "X", "Y" and "Z" whose montages are to be created; basic montage select keys 16a, 16b operated to select any one of a plurality of montages in the montage creation; part designation keys 17a, 17b operated to designate that of a plurality of parts constituting a selected montage and to be changed; pattern select keys 18a, 18b operated to select that of a plurality of part patterns and to be changed, each pattern indicative of the designated part; an entry key 19 operated to store and enter data on the created montage to the device; a battle key 20; a congeniality divination key 21; and a start key 22.

The battle key 20 is operated to designate a location where the created battle montage data is to be stored and to set a battle game mode in which a battle game is played on the basis of the entered battle montage data. The congeniality divination key 21 is operated to designate a location where the congeniality divination montage data is stored and to set a congeniality divination game mode in which a congeniality divination game is played on the basis of the entered congeniality montage data. The start key 22 is operated to start a game in the battle game mode or the congeniality divination mode.

The left operation surface 12a of the left casing half of the game device body 11 is provided with a display 23 composed of a liquid crystal matrix. The display 23 is provided with "X" or "Y" or "Z" montage display areas.

The right operation surface 12b of the right casing half is provided with a ten-key unit 24 of keys "0"–"9" operated to input numerical data to the device body 11; an operand key unit 25 composed of "+", "−", "×", "÷" and "="; and an alphabetic key unit 26 composed of keys "A"–"Z" for inputting various data to the device body.

Figure 2:
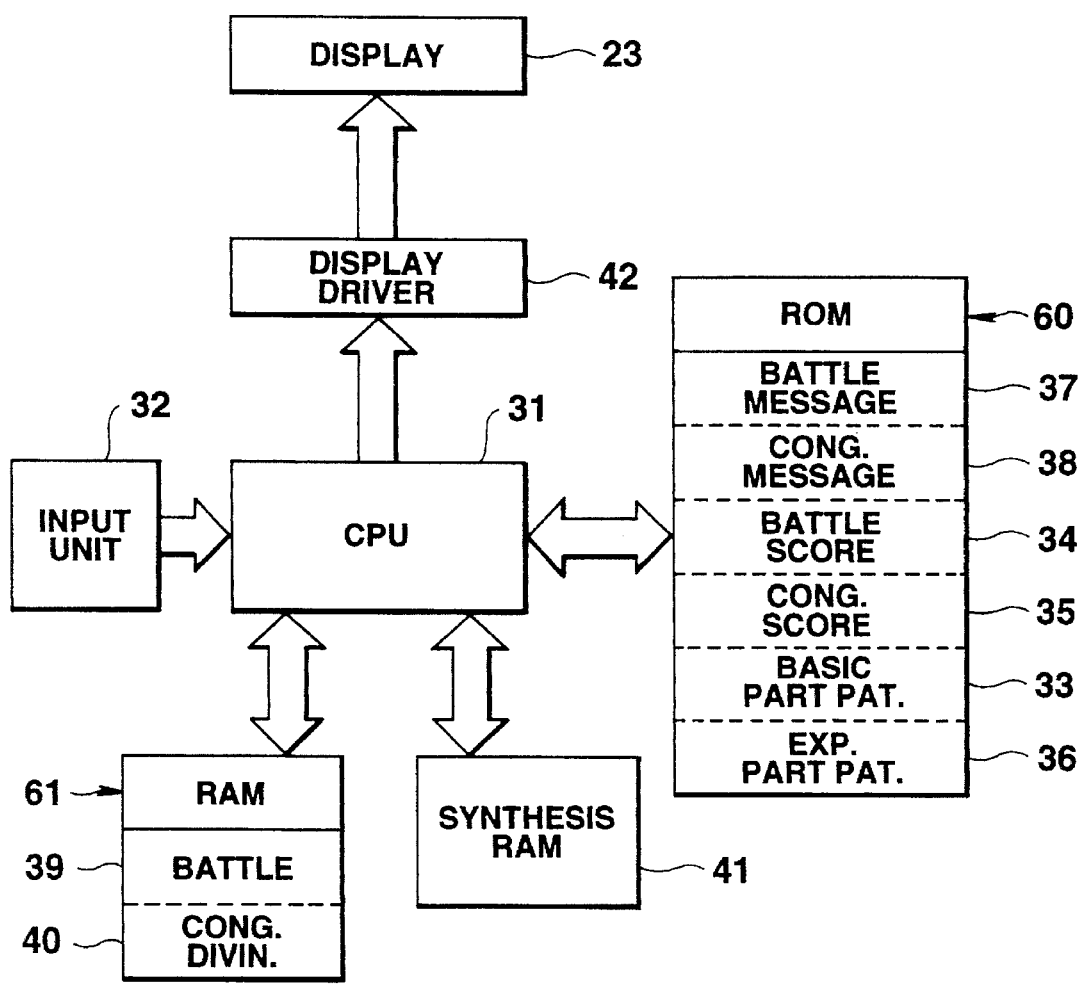
FIG. 2 is a block diagram of an electronic circuit of the montage game device as the first embodiment.

FIG. 2 is a block diagram of the entire electric circuit of the montage game device. The electric circuit is provided with a CPU (Central Processing Unit) 31, to which an input unit 32 is connected. The input key unit 32 is composed of the battle key 20; congeniality divination key 21; start key 22; ten-key unit 24; operand key unit 25, etc. The respective operations of the circuits are controlled on the basis of programs stored beforehand in a built-in program ROM (Read Only Memory) in accordance with a keyed-in operative signal fed from the input unit 32. In addition, the input unit 32, ROM assembly 60, RAM (Random Access Memory) assembly 61, synthesis RAM 41, and display 23 through a display driver 42 are connected to CPU 31.

The ROM assembly 60 is provided with a basic part pattern ROM 33; a battle score ROM 34; a congeniality score ROM 35; an expression part pattern ROM 36; a battle message ROM 37; and a congeniality message ROM 38.

The RAM assembly 61 is provided with a battle montage RAM 39 and a congeniality divination montage RAM 40.

FIG. 3A shows a stored state of basic patterns of parts of each of face montages in the basic part pattern ROM. FIG. 3B shows a stored state of basic part patterns of each of whole body montages in the basic part pattern ROM 33.

The basic part pattern ROM 33 for the face montage shown in FIG. 3A stores part image data on the patterns of 5 parts ("contour, "hair style", "eyes", "nose", and "mouth") constituting each of 20 kinds of faces of human beings, animals, spacemen, etc., in correspondence to numbers "01"–"20" in the form of bit map data in a predetermined area 33a. In the particular embodiment, for the "contour" pattern, a "substantially half-oval jaw" is stored at a storage location "01" for the "contour" part; and a "rounded jaw" is stored at a storage location "02" for the "contour" part. For the hair style pattern, a "hair parted at the side" is stored at a storage location "01" for the "hair style" part; and a "long hair" is stored at a storage location "02" for the "hair style" part. Similarly, the respective patterns of the other parts are stored.

Twenty kinds of part patterns of each of a face, trunk, both hands, and both arms and legs of a person are stored in correspondence to the numbers "01"–"20" in a predetermined storage area 33b of the basic part pattern ROM 33 for a whole body montage shown in FIG. 3B.

Figure 4A:
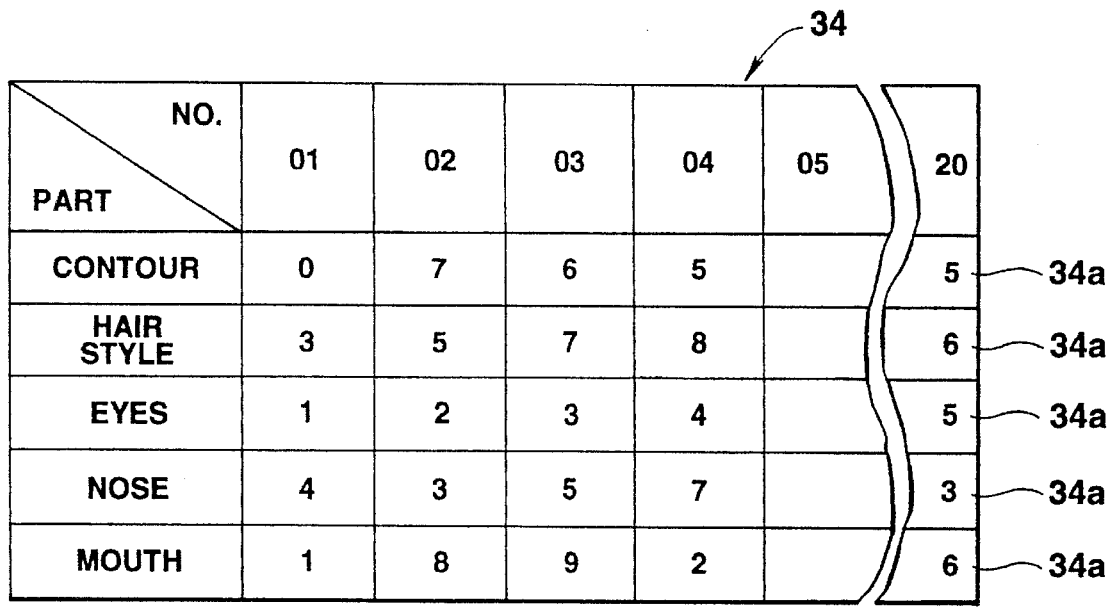
FIG. 4A shows a stored state of battle scores for face montages in a battle score ROM.
Figure 4B:
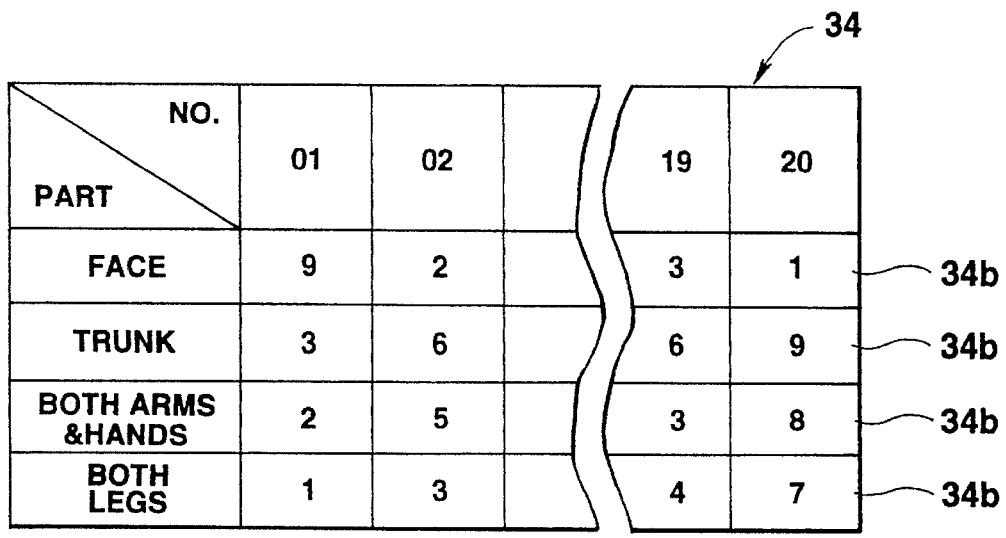
FIG. 4B shows a stored state of battle scores for whole body montages in the battle score ROM.

FIG. 4A shows a stored state of battle scores for the face montages in the battle score ROM 34. FIG. 4B shows a stored state of battle scores for the whole body montage data in the battle score ROM 34.

Battle scores allocated any one of "0"–"9" in one-to-one correspondence to the respective basic part patterns (contour, hair style, nose, eyes, mouth×Nos. "01"–"20") for the face montage in the basic part pattern ROM 33 are stored in respective areas 34a of the battle score ROM 34 for the face montage of FIG. 4A. For example, a battle score "0" is stored in an area 34a of the battle score ROM 34 for the face montage corresponding to the part pattern No. 01 of the "contour" in the basic part pattern ROM 33. Similarly, a battle score "7" is stored in an area 34a of the battle score ROM 34 for the face montage corresponding to a "contour" part pattern No. "02".

Battle scores allocated any one of "0"–"9" in one-to-one correspondence to the respective basic part patterns (face, trunk, body, both arms and hands, both legs×Nos. "01"–"20") for the whole body montage in the basic part pattern ROM 33 are stored in respective areas 34b of the battle score ROM 34 for the whole body montage of FIG. 4B. For example, a battle score "9" is stored in an area 34b of the battle score ROM 34 for the whole body montage corresponding to the part pattern No. "01" of the "face" in the basic part pattern ROM 33. Similarly, a battle score "2" is stored in the area 34b of the battle score ROM 34 for the whole body montage corresponding to the part pattern No. "02" of the "face".

Figure 5A:
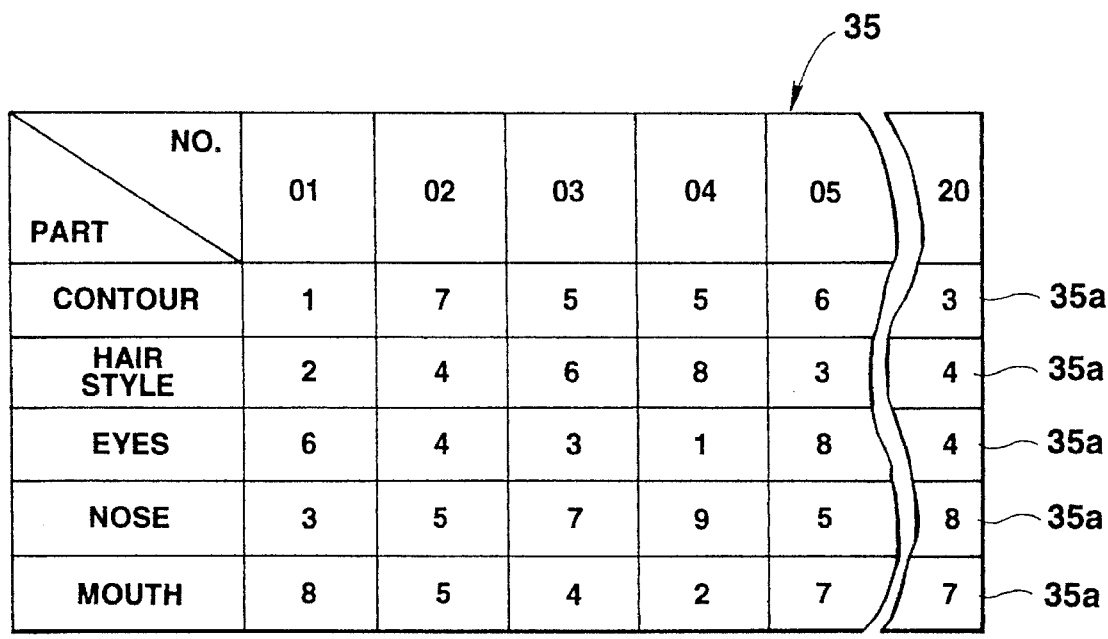
FIG. 5A shows a stored state of congeniality scores for face montages in a congeniality score ROM.
Figure 5B:
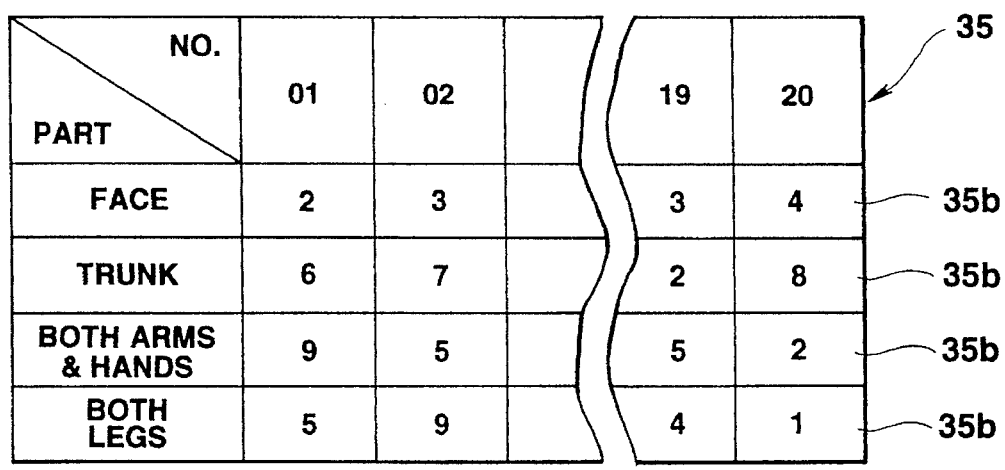
FIG. 5B shows a stored state of congeniality scores for whole body montages in the congeniality score ROM.

FIG. 5A shows a stored state of congeniality scores for a face montage in the congeniality score ROM 35. FIG. 5B shows a stored state of congeniality scores for a whole body montage in the congeniality score ROM 35.

Congeniality scores allocated any one of "0"–"9" in one-to-one correspondence to the respective basic part patterns (contour, hair style, nose, eyes, mouth×Nos. "1"–"20") for the face montage in the basic part pattern ROM 33 are stored in respective areas 35a of the congeniality score ROM 35 for the face montage of FIG. 5A.

Battle congeniality scores allocated any one of "0"–"9" in one-to-one correspondence to the respective basic part patterns (face, trunk, both arms and hands, both legs×Nos. "01"–"20") for the whole body montage in the basic pattern ROM 33 stored in the respective areas 35b of the congeniality score ROM 35 for the whole body montage of FIG. 5B.

FIGS. 6A–6C show a stored state of face expression pattern data in the expression part pattern ROM 36 used in a battle game. FIG. 6A show a stored state of first stage display patterns used in a first stage during the battle. FIG. 6B show a stored state of second stage display patterns used in a second stage of the battle. FIG. 6C shows a stored state of victory result display patterns used when the war is won as the result of the battle.

The display patterns prepared for the respective battle stages are stored in the areas 36a–36c in correspondence to the respective patterns of the parts "eyes" and "mouth" stored in the basic part pattern ROM 33.

The first stage display patterns of FIG. 6A are part patterns constituting each of angry faces. The second stage display patterns of FIG. 6B are part patterns constituting each of sad faces. The victory result display patterns of FIG. 6C are part patterns constituting each of faces present when battle was won and a background pattern fitted into the background of the face montage present at that time.

FIGS. 7A and 7B show a stored state of face expression patterns in the expression part pattern ROM 36 used in a congeniality divination game or a battle game. FIG. 7A show a stored state of congeniality coincidence result display patterns used when the result of congeniality divination shows the coincidence of congeniality. FIG. 7B show a stored state of loss result-congeniality non-coincidence result display patterns in the expression part pattern ROM 36 used when the battle is lost and non-congeniality coincidence was obtained as a result of the divination.

The above respective result display patterns are stored in areas 36d and 36e in the basic part pattern ROM 33 in correspondence to the respective basic part patterns "eyes" and "mouth" in the basic part pattern ROM 33. Congeniality coincidence background patterns to be combined with the background of a face montage present when coincidence of the congenialities are stored in the respective other areas 36d-1 of the expression part pattern ROM 36. Defeat or congeniality non-coincidence background patterns each to be combined with the background of a loser's face montage present at the end of the battle and the background of the face montage at congeniality non-coincidence present at the end of the congeniality divination are stored in other areas 36e-1 of the expression part pattern ROM 36.

The congeniality coincidence result display patterns of FIG. 7A are part patterns constituting an delighted face because of coincidence of congenialities. The defeat result-congeniality non-coincidence result display patterns of FIG. 7B are part patterns constituting a sad face due to a lost battle or substantial non-coincidence of congeniality and a background pattern fitted into the background of the face montage at that time.

FIGS. 8A and 8B each show a stored state of whole body expression patterns in the expression part pattern ROM 36 used in either a congeniality divination game or a battle game. FIG. 8A shows a stored state of the battle victory result-congeniality coincidence result display patterns. FIG. 8B shows a stored state of the battle defeat result-congeniality non-coincidence result display patterns.

The respective result display patterns are stored in the respective areas 36f, 36g in correspondence to the respective basic part patterns of the face, and both arms and hands in the basic part pattern ROM 33.

The congeniality coincidence result display pattern of FIG. 8A show the respective part patterns constituting the body of each of both partners when both the partners are congenial and delighted. The defeat result-congeniality non-coincidence display patterns of FIG. 8B are part patterns composing the body of the loser of the battle or one of the partners who are sad about substantial non-coincidence of congenialities to each other.

Although not shown, a first and a second display pattern present during congeniality divination are stored beforehand in the expression part pattern ROM 36.

FIG. 9 shows a stored state of battle victory and defeat messages in the battle message ROM 37.

Victory/defeat messages different depending on a victory, defeat and draw as a result of the battle are stored in the respective areas 37a of the battle message ROM 37. For example, the victory message "I won, wow!" used when the battle was won, the defeat message "I lost, sorry!" used when the battle was lost, and the draw message "Mmm . . .!" used when the battle was drawn are stored beforehand.

FIG. 10 shows a stored state of congeniality messages in the congeniality message ROM 38.

Congeniality messages different depending on the result of congeniality divination are stored in respective areas 38a in the congeniality message ROM 38. Each message has contents corresponding to the difference between the two sums of congeniality scores obtained from the congeniality score ROM 35 in correspondence to the respective part patterns of any two face or whole body montages which are subjected to congeniality divination. If the score difference is 0–3, the messages "Perfectly congenial!" and "I am delighted!" are stored beforehand as congeniality messages to be associated with those respective montages; if the score difference is 4–15, the messages "Almost congenial!" and "We'll be friends!" are stored; and if the difference score is 16–29, the messages "Never congenial!" and "we'll fight it out in a battle game!" are stored.

FIGS. 11A and 11B show a stored state of battle montage data (respective part pattern numbers) and the corresponding battle scores recorded in the battle montage RAM 39. FIG. 11A shows the X and Y battle face montage data and battle scores. FIG. 11B show the respective X and Y battle whole body montage data and battle scores.

FIG. 11A shows respective pattern numbers "01" (contour), "01" (hair style), "01" (eyes), "02" (nose), and "01" (mouth) of parts (contour, hair style, nose, eyes, mouth) constituting the battle face montage data entered as X by the user and stored in a face montage data storage area 11a in the battle montage RAM 39. FIG. 11A also shows respective battle scores "0", "3", "1" "3, and "1" corresponding to the entered part pattern numbers stored in the storage area 11c.

FIG. 11A shows respective pattern numbers "03" (contour), "20" (hair style), "02" (eyes), "04" (nose), and "02" (mouth) of parts (contour, hair style, nose, eyes, mouth) constituting the battle face montage data entered as Y by the user and stored in a face montage data storage area 11b in the battle montage RAM 39. FIG. 11A also shows respective battle scores "6", "6", "2", "7", and "8" corresponding to the entered part pattern numbers and stored in the storage area 11d.

FIG. 11B shows respective pattern numbers "09" (face), "03" (trunk), "02" (both arms and hands), and "01" (both legs) of parts (face, trunk, both arms and hands, both legs) constituting the battle whole body montage and recorded as X by the user and stored in a whole body montage data storage area 11A of the battle montage RAM 39. FIG. 11B also shows respective battle scores "0", "5", "4" and "3" corresponding to the entered part pattern numbers and stored in the storage area 11C.

FIG. 11b shows respective pattern numbers "07" (face), "09" (trunk), "08" (both arms and hands), and "07 (both legs) of parts (face, trunk, both arms and hands, both legs) constituting the battle whole body montage and recorded as Y by the user and stored in a whole body montage data storage area 11B of the battle montage RAM 39. FIG. 11B also shows respective battle scores "5", "6", "2" and "3" corresponding to the entered part pattern numbers and stored in the storage area 11D.

The total sums of the battle scores of the individual montages are stored in the respective total score areas 11e, 11f, 11E, 11F in the battle montage RAM 39.

A victory or defeat in the battle is determined on the basis of which of the battle total scores of the X and Y montages stored in the areas 11e, 11f, 11E and 11F is larger than another.

FIGS. 12A and 12B each show a stored state of congeniality divination montage data (respective pattern numbers) and congeniality scores recorded in the congeniality divination montage RAM 40. FIG. 12A shows a stored state of respective X and Y congeniality divination face montage data and congeniality score. FIG. 12B shows a stored state of congeniality divination whole body montage data and congeniality scores.

FIG. 12A shows the respective pattern numbers "04" (contour), "04" (hair style), "04" (eyes), "03" (nose), and "04" (mouth) of parts (contour, hair style, nose, eyes, mouth) constituting the congeniality divination face montage data recorded as X by the user and stored in a face montage data storage area 12C in the congeniality divination montage RAM 40. FIG. 12A also shows respective congeniality scores "7", "8", "7", "1" and "2" corresponding to the recorded part pattern numbers and stored in the storage area 12c.

FIG. 12A shows the respective pattern numbers "04" (contour), "03" (hair style), "03" (eyes), "01" (nose), and "03" (mouth) of parts (contour, hair style, nose, eyes, mouth) constituting the congeniality divination battle face montage data recorded as Y by the user and stored in a face montage data storage area 12b of the congeniality divination montage RAM 40. FIG. 12A also shows respective congeniality scores "5", "6", "3", "3" and "4" corresponding to the recorded part pattern numbers and stored in the storage area 12d.

FIG. 12B shows respective pattern numbers "02" (face), "06 (trunk), "09 (both arms and hands), and "05 (both legs) of parts (face, trunk, both arms and hands, both legs) constituting the congeniality divination whole body montage data recorded as X by the user and stored in a whole body montage data storage area 12A in the congeniality divination montage RAM 40. FIG. 12B also shows respective congeniality scores "1", "2", "3 and "2" corresponding to the recorded part pattern numbers and stored in the storage area 12C.

FIG. 12B also shows respective pattern numbers "04" (face), "08 (trunk), "02 (both arms and hands), and "01 (both legs) of parts (face, trunk, both arms and hands, both legs) constituting the congeniality divination whole body montage data recorded as Y by the user and stored in a whole body montage data storage area 12B of the congeniality divination montage RAM 40. FIG. 12B also shows respective congeniality scores "0", "0", "1" and "2" corresponding to the recorded part pattern numbers and stored in the storage area 12D.

The total sums of the congeniality scores of the individual montages are stored in the respective total score storage areas 12e, 12f, 12E, 12F in the congeniality divination montage RAM 40.

The congeniality degree between both the X and Y montages is determined on the basis of which of the respective total congeniality scores of the X and Y montages stored in the areas 12e, 12f, 12E and 12F is larger than the other.

The synthesis RAM 41 synthesizes in the form of bit map data X-Z montages from the respective part patterns read out from the basic part pattern ROM 33 in correspondence to the X-Z montage data (respective part pattern numbers) in the battle game mode or in the congeniality divination game mode.

The display 23 displays side by side the X-Z montages synthesized by the synthesis RAM 41 through the display driver 42 as being used for battle or congeniality divination.

The operation of the present montage game device will be described below.

<Montage Creation>

Figure 13:
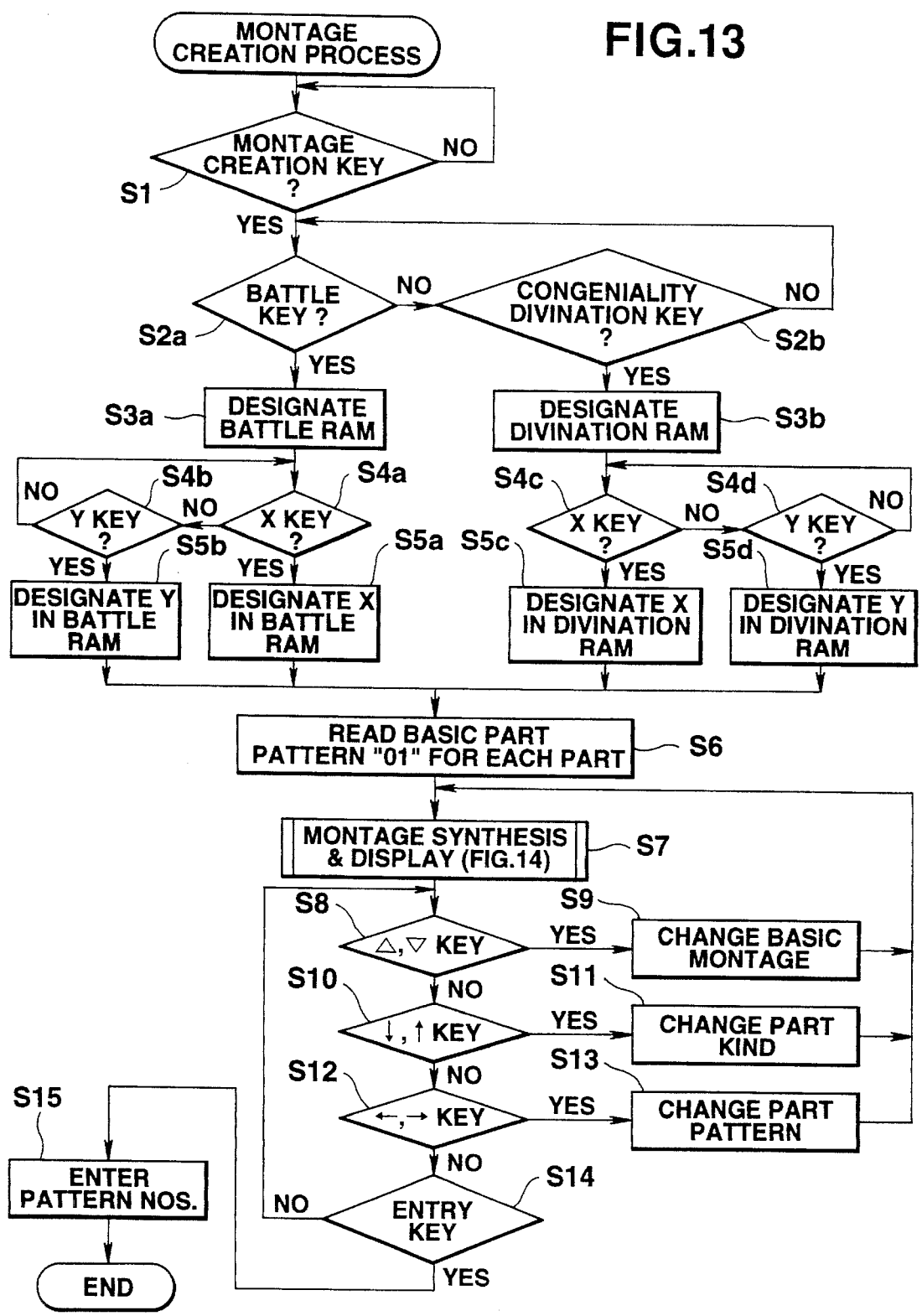
FIG. 13 is a flowchart indicative of a montage creation process in the first embodiment.

FIG. 13 is a flowchart indicative of a montage creation process in the montage game device.

When the montage creation key 14 of the input unit 32 is first operated, the CPU 31 sets the montage creation mode (step S1).

In the set montage creation mode, when the battle key 20 is operated to create a battle X or Y montage (step S2a), the battle montage RAM 39 is designated as a storage in which the montage data is to be stored (step S3a).

Next, when the X key 15a is operated to create the X montage which is an opponent (step S4a), an X side montage data storage area 11a or 11A (FIGS. 11A, 11B) in the battle montage RAM 39 is designated (step S5a).

The patterns of parts indicative of montage data constituting a first basic montage and corresponding to the pattern number "01" are read out from the basic part pattern ROM 33 (step S6) and transferred to the synthesis RAM 41, in which a montage is synthesized from the transferred part patterns and then displayed as a battle X montage on the display 23 (step S7).

Figure 14:
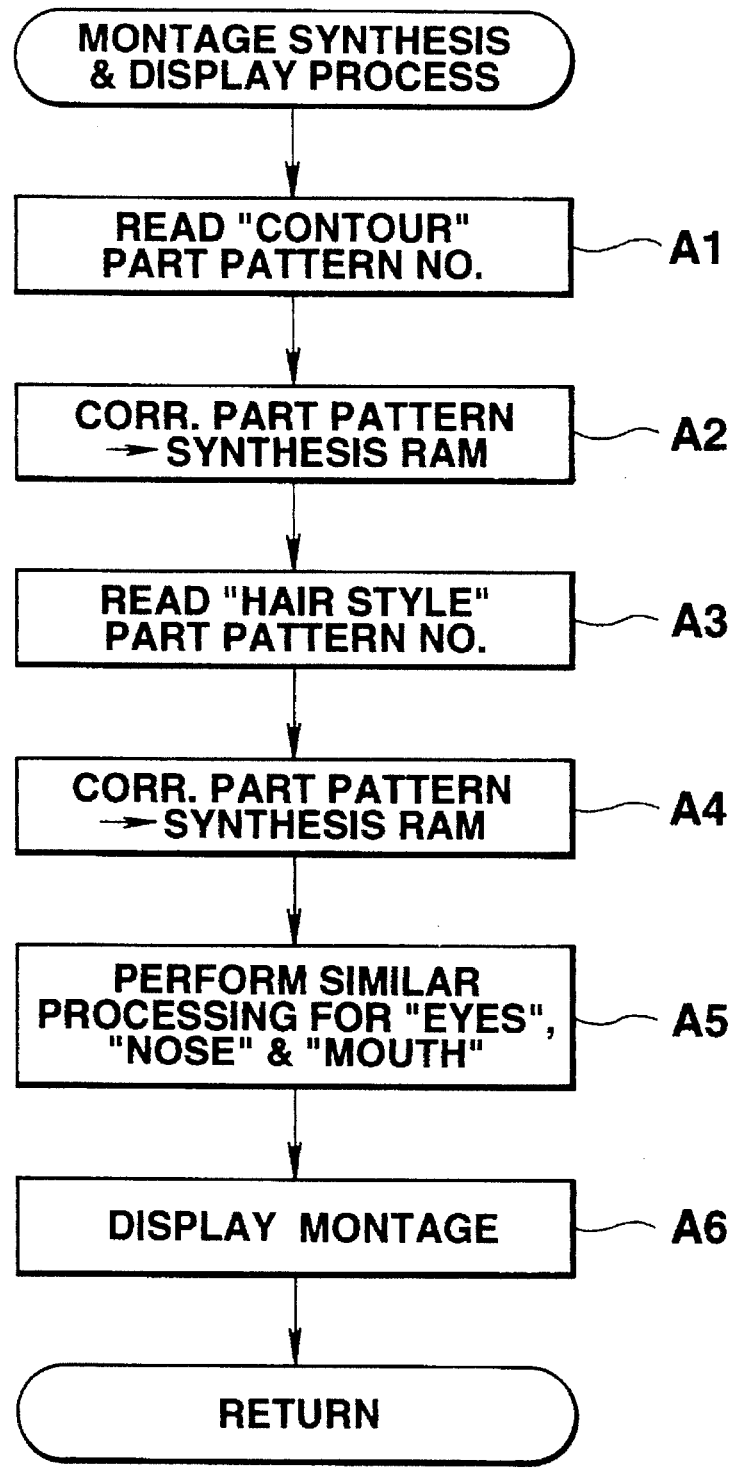
FIG. 14 a flowchart indicative of synthesization and display of a montage involved in the montage creation process.

FIG. 14 is a flowchart indicative of the process of synthesis and display of the montage performed in the course of the montage creation process.

In the synthesis and display process, a set of pattern numbers of parts constituting the first basic montage data is stored as montage data in the battle montage data RAM 39 in the initial setting process. Simultaneously, of the stored pattern numbers of the parts, the pattern number of the part "contour" is first read out (step A1). The part pattern "contour" is read out from the basic part pattern ROM 33 on the basis of the read pattern number of the part "contour", and transferred to and combined in the synthesis RAM 41 (step A2).

Next, of the respective pattern numbers of parts constituting the X montage, the pattern number of a part "hair style" is read out (step A3). A part pattern "hair style" is read out from the basic part pattern ROM 33 on the basis of the read pattern number of the part "hair style", and transferred to and combined in the synthesis RAM 41 (step A4). In this way, the pattern numbers of the parts "eyes", "nose", "mouth" are then read out sequentially. The part patterns of the parts "eyes", "nose", "mouth" are read out from the basic part pattern ROM 33 on the basis of the read pattern number of the parts "eyes", "nose", "mouth" and transferred to and combined in the synthesis RAM 41 (step A5).

Thus, the first basic montage composed of a combination of the part patterns corresponding to the pattern number "01" is displayed on the display 23 (step A6).

When the basic montage select key 16b of the input unit 32 is operated in a state where the first basic montage is displayed on the display 23, the set of part pattern numbers "01" stored in the battle montage data RAM 39 is all changed from "01" to "02" (steps S8, S9).

This causes data on a set of part patterns corresponding to the changed set of part pattern numbers "02" to be read out from the basic part pattern ROM 33 and combined and displayed by the synthesis RAM 41. Thus, a second basic montage composed of all the part patterns corresponding to the pattern number "02" and covering "contour" to "mouth" is displayed on the display 23 (step S7).

Further operation of the basic montage select key 16a, 16b repeats the process at steps S7–S9 to sequentially change and selectively display the 20 kinds of basic montages.

By such operation, the user selects a basic montage similar to an X montage to be created from among the 20 kinds of basic montages and displays that montage on the display 23.

When all or part of that displayed montage is desired to be corrected in a state in which that montage is displayed, the part designation keys 17a, 17b are operated (step S10) to change a particular part of the displayed basic montage to another one. When the part designation keys 17a, 17b are operated, the particular part number is changed from the current stored part number to another (step S11).

When the part pattern select keys 18a, 18b are then operated (step S12), the pattern numbers of the changed part stored in the basic part pattern ROM 33 are changed to another (step S13). This causes a part pattern corresponding to the changed part pattern number to be read out from the basic part pattern ROM 33, and combined in the synthesis RAM 41 and the resulting montage is newly displayed on the display 23 instead of the previous montage (step S13→S7).

Thus, the user can change the pattern of a particular part of the basic montages displayed beforehand on the display 23 to another and display same.

In addition, when the pattern of a further part is desired to be changed to another, the part designation keys 17a, 17b and then the pattern select keys 18a, 18b are required to be operated. (steps S10–S13→S7).

If the entry key 19 of the input unit 32 is operated (step S14) when the display of the X montage which the user has desired has been obtained, the part pattern numbers corresponding to the X montage synthesized in the synthesis RAM 41 are entered as battle X montage data in montage data storage area 11a or 11A of the battle montage RAM 39 (FIGS. 11A, 11B)(step S15).

Similarly, when a Y montage which is an opponent is desired to be created, the montage creation key 14 is similarly operated to set the montage creation mode, the battle key 20 and the Y key 15b are operated to designate a Y side montage data storage area 11b or 11B (FIGS. 11A, 11B) in the battle montage RAM 39 as a storage location where the Y montage data is to be stored (steps S1, S2a, S3a, S4b, S5b). Similarly, repetition of selection of a basic montage by the basic montage select keys 16a, 16b, selection of parts by the part designation keys 17a, 17b and selection of the part patterns by the pattern select keys 18a, 18b causes the respective part patterns corresponding to the desired Y montage to be read out from the basic part pattern ROM 33, and to be combined in the synthesis RAM 41 into a Y montage, which is then displayed on the display 23 (steps S6–S13).

Thus, by operating the entry key 19 of the input unit 32 after the display of the desired Y montage is ascertained, the numbers of the respective part patterns corresponding to the Y montage synthesized in the synthesis RAM 41 are entered as the battle Y montage data in the area 11b or 11B of the battle montage RAM 39 (FIGS. 11A, 11B) (steps S14, S15).

Similarly, when a Z montage which is an opponent is desired to be created, the montage creation key 14 is operated to set the montage creation mode, and the battle key 20 and the Z key 15c are operated. Repetition of designation of a Z side montage data storage area (FIG. 11A or 11B) in the battle montage RAM 39 as a storage location where the Z montage data is to be stored, selection of a basic montage by the basic montage select keys 16a, 16b, selection of parts by the part designation keys 17a, 17b and selection of the part patterns by the pattern select keys 18a, 18b causes the respective part patterns corresponding to the desired Z montage to be read out from the basic part pattern ROM 33, and to be combined in the synthesis RAM 41 into a Z montage, which is then displayed on the display 23. Thus, by operating the entry key 19 of the input unit 32 after the display of the desired Z montage is ascertained, the respective part pattern numbers corresponding to the Z montage synthesized in the synthesis RAM 41 are entered as the battle Z montage data in the respective areas (FIGS. 11A and 11B) of the battle montage RAM 39 (FIGS. 11A, 11B). Those steps are the same as the steps of creation and entry of the X and Y montages, as mentioned above, so that they are not shown in the flowchart.

In this way, the battle X, Y and Z face or whole body montage data (respective part pattern numbers) created for the battle is entered in the battle montage RAM 39 (FIGS. 11A, 11B).

<Congeniality Divination Montage Creation Process>

When an X montage for congeniality divination is desired to be created in the montage creation process of FIG. 13, the following operation is performed.

First, the montage creation key 14 is operated (step S1) to set the montage creation mode. The congeniality divination key 21 and X key 15a are then operated to designate an X side montage storage area 12a or 12A (FIGS. 12A, 12B) of the congeniality divination montage RAM 40 as a storage in which the X montage data is to be stored (steps S2b, S3b, S4c, S5c).

In a manner similar to the above-mentioned battle montage creation, repetition of selection of a basic montage by the basic montage select keys 16a, 16b, selection of parts by the part designation keys 17a, 17b and selection of the part patterns by the pattern select keys 18a, 18b causes the respective part patterns corresponding to the desired X montage to be read out from the basic part pattern ROM 33, and to be combined in the synthesis RAM 41 into the X montage, which is then displayed on the display 23 (steps S6–S13).

Thus, by operating the entry key 19 of the input unit 32 after achievement of the display of the desired X montage is ascertained, the respective part pattern numbers corresponding to the X montage synthesized in the synthesis RAM 41 are entered as the congeniality divination X montage data in the respective montage data storage areas 12a or 12A of the congeiality divination montage RAM 40 (FIGS. 12A and 12B) (steps S14, S15).

Similarly, when a Y montage which is another partner for congeniality divination is desired to be created, the montage creation key 14 is operated to set the montage creation mode. The congeniality divination key 21 and the Y key 15b are then operated to designate a Y side montage data storage area 12b or 12B (FIG. 12A or 12B) in the congeniality divination montage RAM 40 as a storage location where the Y montage data is to be stored (step S1, S2b, S3b, S4d, S5d). In a manner similar to the above-described manner, repetition of selection of a basic montage by the basic montage select keys 16a, 16b, selection of parts by the part designation keys 17a, 17b and selection of the part patterns by the pattern select keys 18a, 18b causes the respective part patterns corresponding to the desired Y montage to be read out from the basic part pattern ROM 33, and to be combined in the synthesis RAM 41 into the Y montage, which is then displayed on the display 23 (steps S6–S13).

Thus, by operating the entry key 19 of the input unit 32 after achievement of the display of the desired Y montage is ascertained, the respective part pattern numbers corresponding to the Y montage synthesized in the synthesis RAM 41 are entered as the congeniality divination Y montage data in the respective montage data storage areas 12b, 12B of the congeniality divination montage RAM 40 (FIGS. 12A, 12B) (steps S14, S15).

In this way, data on the battle X-Z face or whole body montages (respective part pattern numbers) created for the battle are entered in the battle montage RAM 39 (FIGS. 11A, 11B).

When a Z montage which is another opponent is desired to be created, a similar operation is performed: The montage creation key 14 is operated to set the montage creation mode. The congeniality divination key 21 and the Z key 15c are then operated. Repetition of designation of a Z side montage data storage area (FIG. 12A or 12B) in the congeniality divination montage RAM 40 as a storage location where the Z montage data is to be stored, selection of a basic montage by the basic montage select keys 16a, 16b, selection of parts by the part designation keys 17a, 17b and selection of part patterns by the pattern select keys 18a, 18b causes the respective part patterns corresponding to the desired Z montage to be read out from the basic part pattern ROM 33 and to be combined in the synthesis RAM 41 into the Z montage, which is then displayed on the display 23. By operating the entry key 19 of the input unit 32 after achievement of the display of the desired Z montage is ascertained, the respective part pattern numbers corresponding to the Z montage synthesized in the synthesis RAM 41 is entered as the congeniality divination Z montage data in the respective montage data storage areas of the congeniality divination montage RAM 40 (FIGS. 12A, 12B) (steps S14, S15). Those steps are the same as the steps of creation and entry of the X and Y montages, as mentioned above, so that they are not shown in the flowchart.

In this way, the congeniality divination X-Z face or whole body montage data (respective part pattern numbers) are entered in the congeniality divination montage RAM 40 (FIGS. 12A, 12B).

<Battle Game Process>

Figure 15:
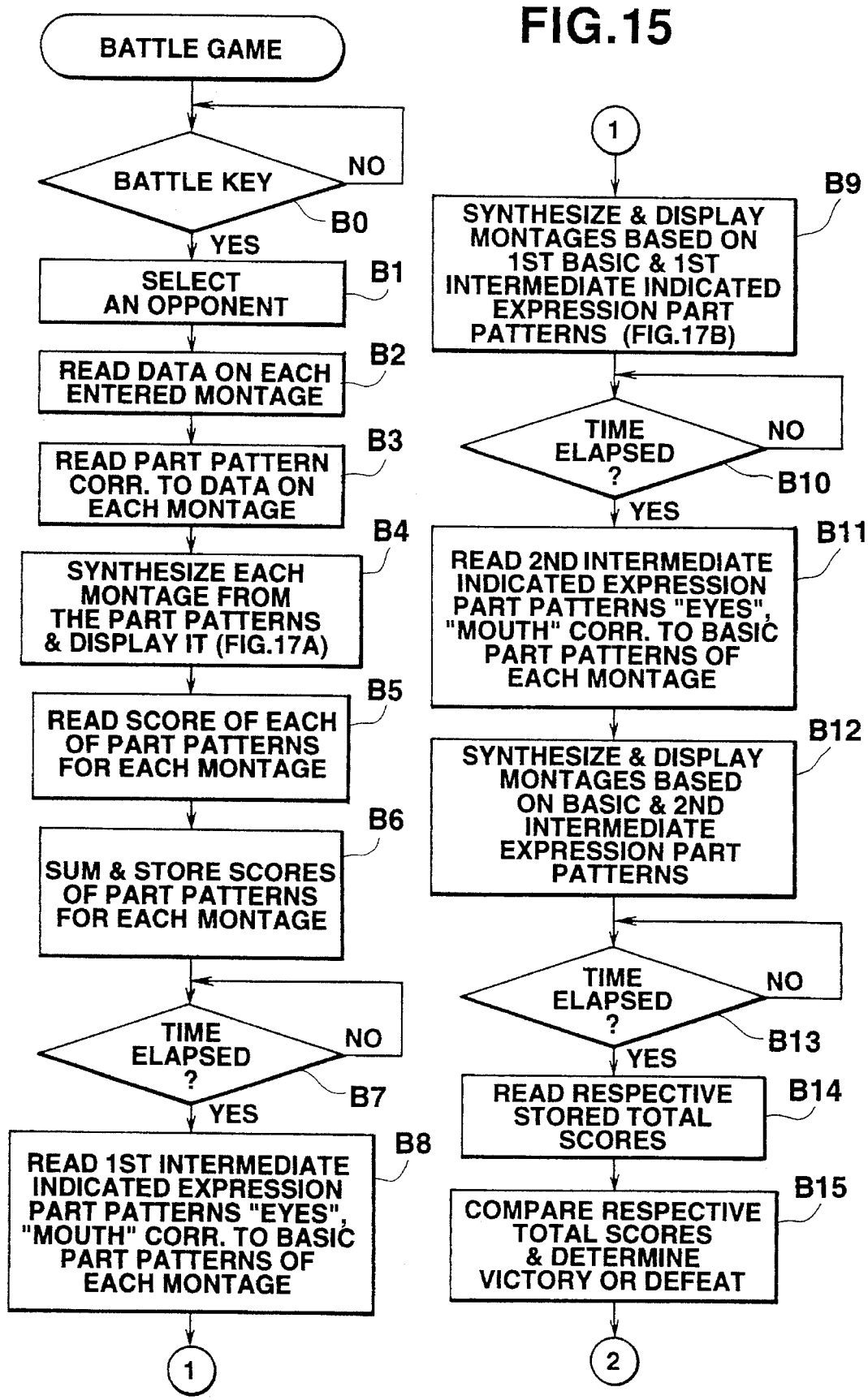
FIG. 15 is a flowchart indicative of a process for the former half of a battle game.
Figure 16:
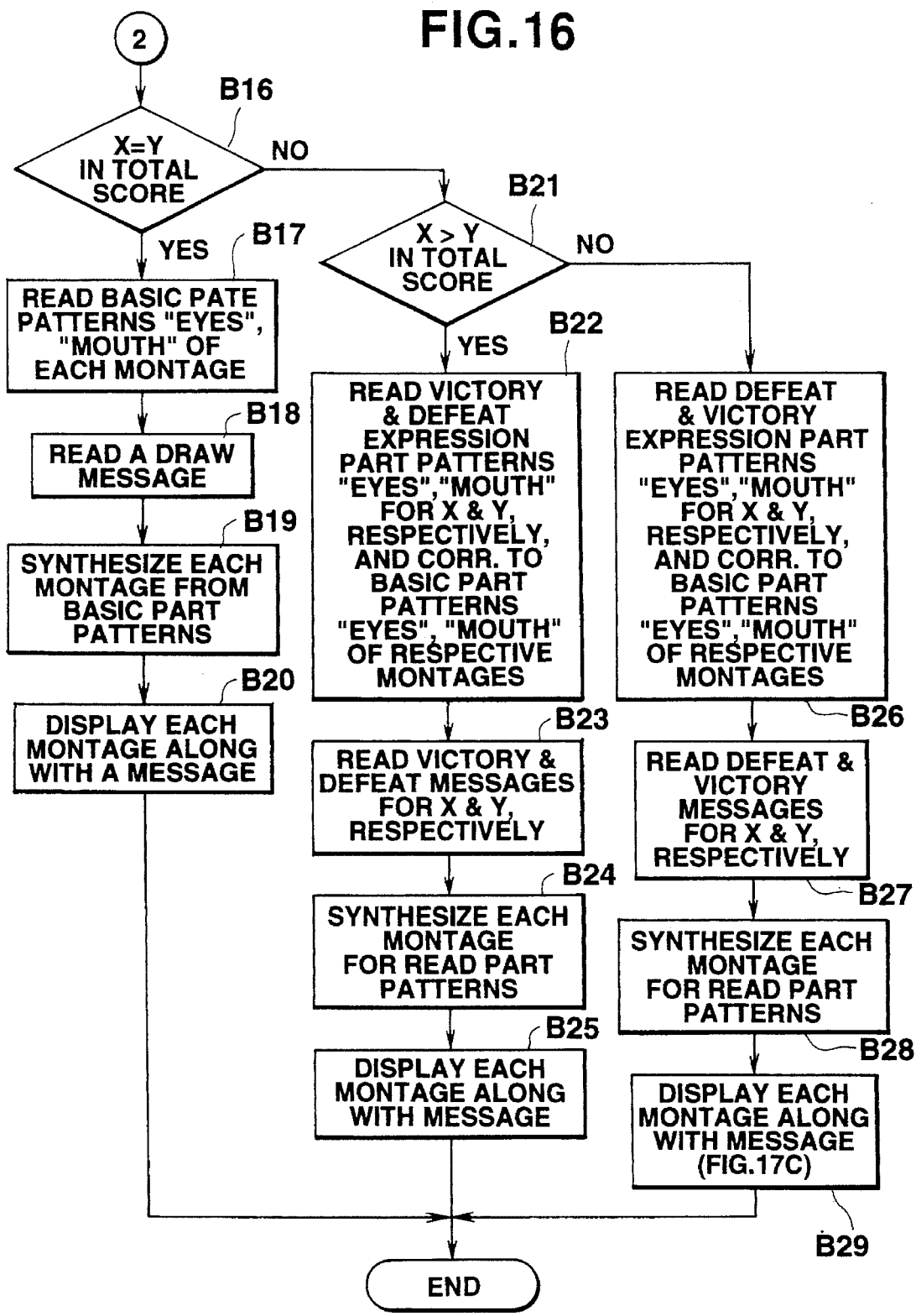
FIG. 16 is a flowchart indicative of a process for the latter half of the battle game.
Figure 17A:
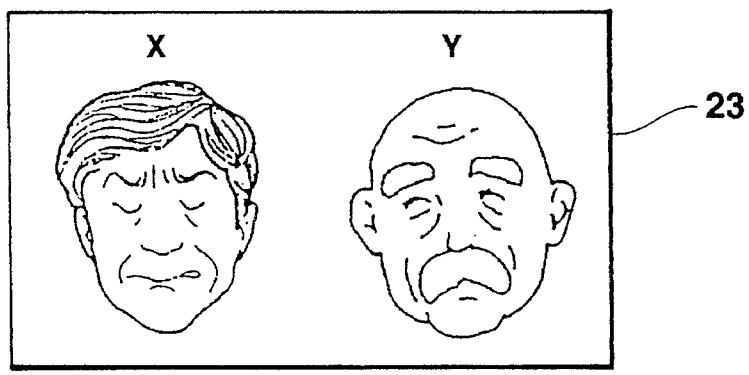
FIGS. 17A–17C each show a displayed state of X and Y montages involved in the process for the battle game.
Figure 17B:
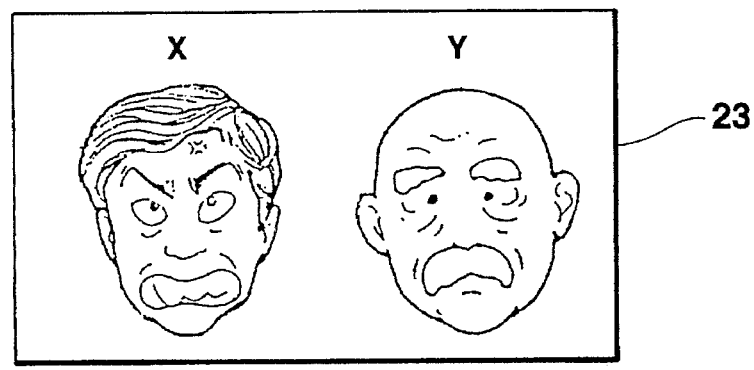
Figure 17C:
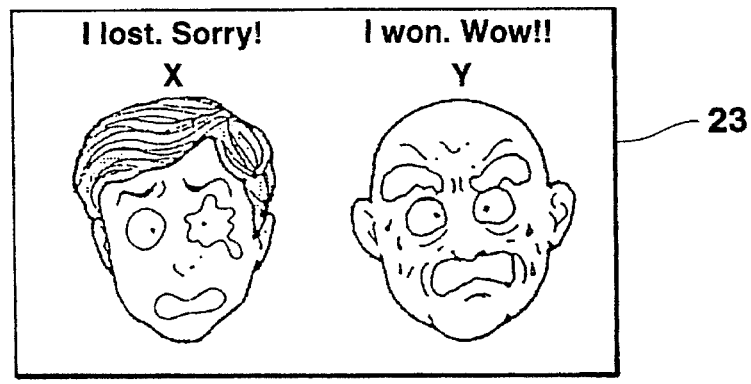

FIG. 15 shows the former half of a battle game process performed by the montage game device. FIG. 16 shows the latter half of the battle game process. FIG. 17A–17C shows a displayed state of the X and Y montages involved in the battle game process.

When this process is performed, it is assumed that X, Y and Z battle face montage data of FIG. 11A is entered beforehand in the battle montage RAM 39 after the montage creation process (FIGS. 13, 14).

First, when the battle key 20 is operated in the former half of the battle game process of FIG. 15 (step B0), CPU 31 sets the battle game mode. The montages of two persons who are opponents to each other are selected from among the X, Y and Z montages (step B1). For example, if the X and Y montages are selected, the X and Y face montage data (FIG.

11A) entered in montage data storage areas 11a, 11b of the battle montage RAM 39 are read out (step B2).

The respective part patterns corresponding to the X and Y face montage data read out from the battle montage RAM 39 are read out of the basic part pattern ROM 33 (step B3). The read part patterns read out are combined in the synthetic memory 41. Thus, as shown in FIG. 17A, the X and Y face montages for battling purposes are displayed (step B4).

Simultaneously, the face montage battle scores for the part patterns constituting the respective X and Y face montages are read out from the corresponding battle score storage areas 34a (FIG. 4A) of the battle score ROM 34 (step B5) and stored in the respective battle score storage areas 11c, 11d of the battle montage RAM 39 corresponding to the X and Y.

The battle scores of the respective parts stored in the battle score storage areas 11c and 11d are summed for each of the face montages. The respective total sums of the battle scores are stored in the corresponding total sum score storage areas 11e and 11f (FIG. 11A) (step B6).

As shown in FIG. 17A, when a predetermined time, for example, of 3 seconds, has elapsed in a state where the respective face montages of the X and Y who are battle opponents to each other are displayed (step B7), the part patterns "eyes" and "mouth" in the intermediate portion of the first stage are read automatically read out from the part pattern areas (FIG. 6A) of an expression part pattern ROM 36 in correspondence to the respective pattern numbers of the parts "eyes" and "mouth" in each of the face montage (step B8). Thus, the old part patterns "eyes" and "mouth" alone are replaced with those read part patterns in the synthetic memory 41. Thus, as shown in FIG. 17B, expression changes are imparted to the X and Y face montages in the first battle stage and the X and Y face montages in the former half stage of the battle are displayed (step B9).

If a further predetermined time, for example, of 3 seconds, has elapsed in a state in which the X and Y face montages in the former half stage of the battle of FIG. 17B are displayed (step B10), data on the respective patterns of the parts "eyes" and "mouth" for the display of the intermediate portion of the second stage are read out from the part pattern area 36b (FIG. 6B) of the expression part pattern ROM 36 in correspondence to the pattern numbers of the parts "eyes" and "mouth" of each of the face montages (step B11). The old part patterns "eyes" and "mouth" alone are replaced with the read new "eyes" and "mouth" for synthesizing purposes in the synthetic memory 41. Thus, expression changes at the second battle stage are imparted to the respective face montages, and the respective resulting X and Y face montages in the latter half stage of the battle are displayed (step B12).

Thereafter, if another predetermined time, for example, of 3 seconds, has elapsed (step B13), the X and Y battle total sum scores stored in the X and Y total sum score storage areas 11e, 11f (FIG. 11A) of the battle montage RAM 39 at step B6 are read out (step B14). Thus, it is determined whether X is a winner and Y is a loser by comparison between the battle total sum scores (step B15). FIG. 11A shows that X and Y have scores "8" and "29", respectively, so that X and Y are judged to be a loser and a winner, respectively.

If the battle total score of the X montage is determined to be equal to that of the Y montage at step B16 of the victory/defeat determining process, the basic part patterns of the parts "eyes" and "mouth" are again read out from the basic part pattern ROM 33 in correspondence to the pattern numbers of the parts "eyes" and "mouth" of the respective face montages (step B17). Thereafter, the draw message "Mmm . . . " stored beforehand in the battle message ROM 37 is read out (step B18).

The basic patterns of the parts "eyes" and "mouth" corresponding to the respective read X and Y face montages are transferred to the synthetic memory 41, where the previous patterns of the parts "eyes" and "mouth" alone are replaced with the read new transferred part patterns in the X and Y face montages displayed as the latter half stage of the battle at step B12, and the resulting basic X and Y face montages are combined with the draw message "Mmm . . . " (step B19).

Thus, the respective X and Y basic face montages stored beforehand in the battle montage RAM 39 are displayed along with the draw message "Mmm . . . " on the display 23 (step B20).

If the total battle score of the X montage is determined to be larger than that of the Y montage at step B21, that is, that X and Y are determined to be a winner and a loser, respectively, the patterns of the parts "eyes" and "mouth" of the winner X montage for display of the result of the victory are read out from the expression part pattern ROM 36 (FIG. 6C) in correspondence to the pattern numbers of the parts "eyes" and "mouth" of the montage of the winner X (FIG. 6C). The patterns of the parts "eyes" and "mouth" of the montage of the loser Y for display of the result of the defeat and a defeat background pattern are read out from the expression part pattern ROM 36 (FIG. 7B) in correspondence to the pattern numbers of the parts "eyes" and "mouth" of the face montage of the loser Y (FIG. step B22).

Thereafter, the victory message "I won. Wow!" and the defeat message "I lost. Sorry!" stored beforehand in the battle message ROM 37 are read for X and Y side displaying purposes, respectively (step B23).

This causes the patterns "eyes" and "mouth" for the result of the victory and corresponding to the X face montage read out from the expression part pattern ROM 36, and the patterns of the parts "eyes" and "mouth" for the result of the defeat and corresponding to the Y face montage read out from the expression part pattern ROM 36 to be transferred to the synthesis memory 41. In the synthesis memory 41, the old patterns of the parts "eyes" and "mouth" alone of the X face montage are replaced with the corresponding ones transferred for the result of the victory displayed as the latter half stage of the battle at step B12 in the X face montage while the old patterns the parts "eyes" and "mouth" alone of the Y face montage are replaced with the corresponding ones transferred for the result of the defeat displayed as the latter half stage of the battle at step B12 in the Y face montage, and the resulting X and Y montages are combined with the X side victory message "I won. Wow!" and the Y side defeat message "I lost Sorry!", respectively, read out from the battle message ROM 37 (step B24).

Thus, the X side face montage is changed so as to have a delightful expression, which is displayed along with the victory message "I won. Wow!" while the Y side face montage is changed so as to have a sad expression, which is displayed along with the defeat message "I lost. Sorry!" (step B25).

If the total battle score of the Y montage is determined to be larger than that of the X montage at step B21, that is, X and Y are determined to be a loser and a winner, respectively, the patterns of the parts "eyes" and "mouth" for display of the result of the defeat and the defeat background pattern are read out from the expression part pattern ROM 36 (FIG. 7B) in correspondence to the pattern numbers of the parts "eyes" and "mouth" of the face montage of the loser X. The patterns of the parts "eyes" and "mouth" for display of the result of the victory are read out from the expression part pattern ROM 36 (FIG. 6C) in correspondence to the pattern numbers of the parts "eyes" and "mouth" of the face montage of the winner Y (FIG. step B26). The defeat message "I lost. Sorry!" and the victory message "I won. Wow!" stored beforehand in the battle message ROM 37 are read for X and Y side displaying purposes, respectively (step B27).

This causes the patterns "eyes" and "mouth" for the result of the defeat and corresponding to the X face montage read out from the expression part pattern ROM 36, and the patterns of the parts "eyes" and "mouth" for the result of the victory and corresponding to the Y face montage read out from the expression part pattern ROM 36 to be transferred to the synthesis memory 41. In this memory the X and Y side old patterns of the parts "eyes" and "mouth" alone are replaced with the corresponding transferred ones as patterns indicative of the results of the defeat and victory in the X and Y face montages, respectively, shown as the latter half stage of the battle at step B12, and the resulting X and Y face montages are combined with the X side defeat message "I lost. Sorry!" and the Y side victory message "I won. Wow!", read out from the battle message ROM 37 (step B28).

Thus, for example, as shown in FIG. 17C, the X face montage is changed so as to have a sad expression, which is displayed along with the defeat message "I lost. Wow!" while the Y face montage is changed so as to have a delightful expression, which is displayed along with the victory message "I won. Wow!" (step B29).

<Congeniality Divination Game Process>

Figure 18:
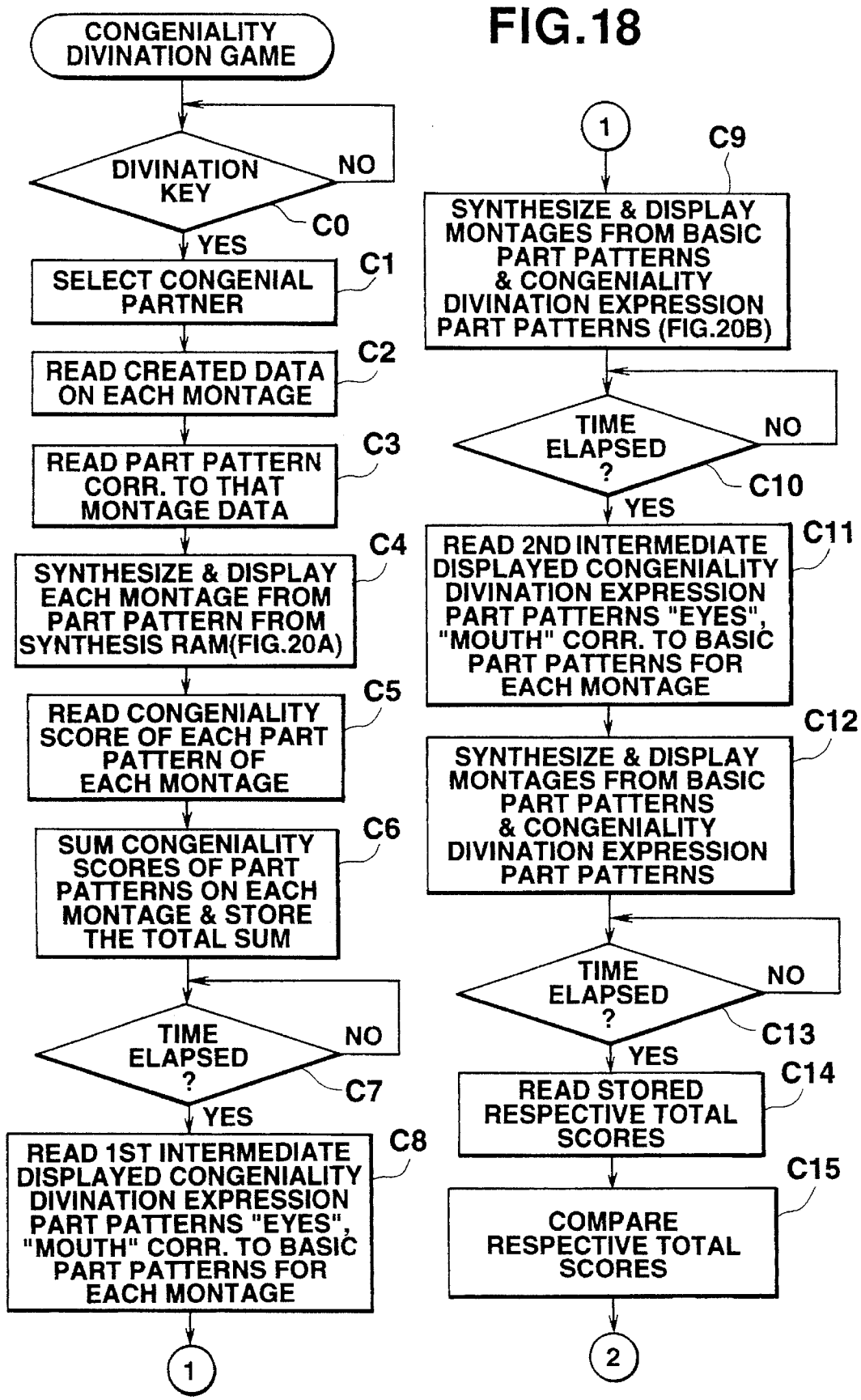
FIG. 18 is a flowchart indicative of a process for the former half of a congeniality divination game.
Figure 19:
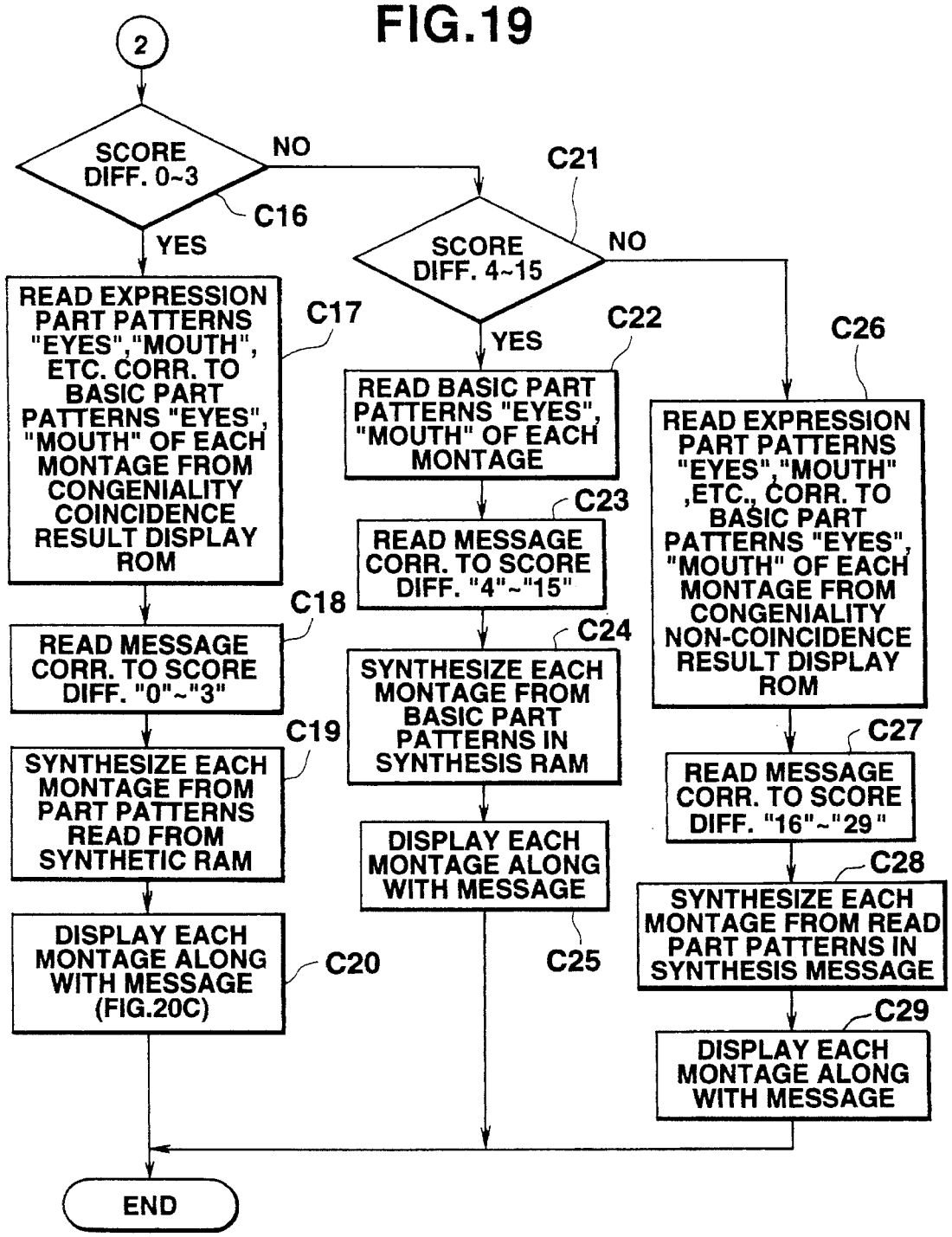
FIG. 19 is a flowchart indicative of a process for the latter half of the congeniality divination game.
Figure 20A:
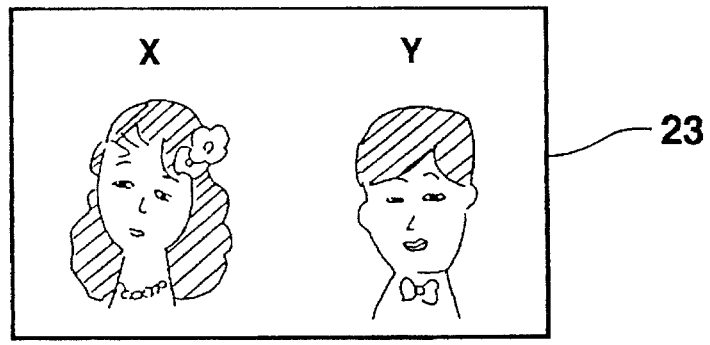
FIGS. 20A–20C each show a displayed state of X and Y montages involved in the process for the congeniality divination game.
Figure 20B:
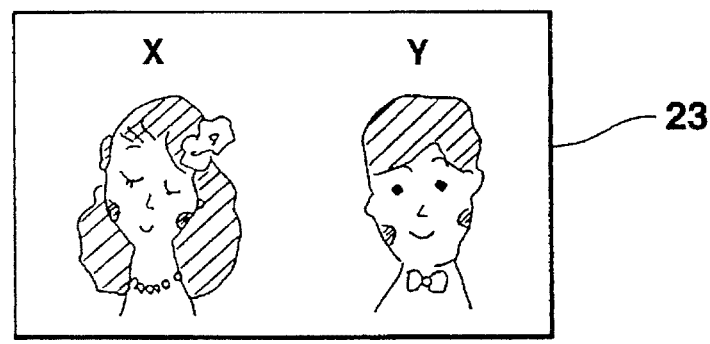
Figure 20C:
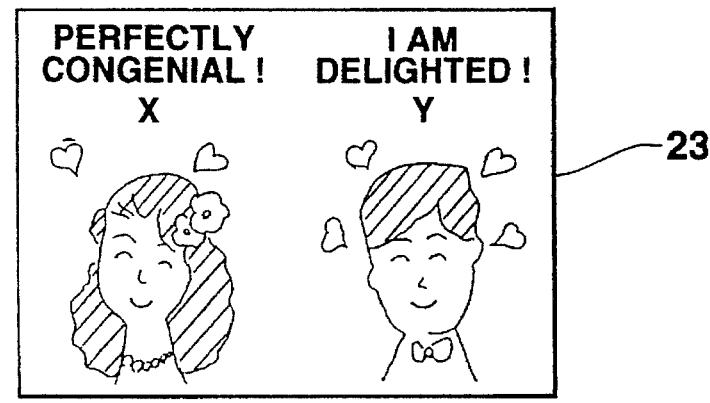

FIG. 18 shows the former half process of a congeniality divination game performed in the montage game device and FIG. 19 shows the latter half process of the game. FIGS. 20A–20C show displayed states of the X and Y montages in the congeniality divination game.

In this process, it is assumed that X-Z congeniality divination face montage data of FIG. 12A which is obtained in the montage creation process (FIGS. 13 and 14) is stored beforehand in the congeniality divination montage RAM 40.

First, when the congeniality divination key 21 is operated in the former half of the congeniality divination game process of FIG. 18 (step C0), CPU 31 sets the congeniality divination game mode. The montages of two persons who are partners for each other are selected from among the X, Y and Z montages (step C1). For example, if the X and Y montages are selected, the X and Y montage face montage data (FIG. 12A) entered in the congeniality divination montage RAM 40 is read out (step C2).

The respective part patterns constituting each of the X and Y face montages are read out from the basic part pattern ROM 33 in correspondence to the read X and Y face montage data (step C3) and combined to synthesize X and Y face montages in the synthesis memory 41. Thus, as shown in FIG. 20A, the X and Y face montages for congeniality divining purposes are displayed (step C4).

The face montage congeniality scores for the part patterns constituting the respective X and Y face montages are read out from the corresponding congeniality score areas 35*a* (FIG. 5A) of the congeniality score ROM 35 and stored in the respective X and Y congeniality score storage areas 12*c*, 12*d* of the congeniality divination montage RAM 40 (step C5). The stored congeniality scores for the respective parts are summed for each of the face montages. The respective X and Y sum scores are stored in the corresponding sum score storage areas 12*e* and 12*f* (FIG. 12A) (step C6).

As shown in FIG. 20A, when a predetermined time, for example, of 3 seconds, has elapsed after the face montages of the X and Y who are partners for each other are displayed (step C7), the patterns of the parts "eyes" and "mouth" for display of the intermediate portion of the first stage for congeniality divination are read out from the expression part pattern ROM 36 in correspondence to the pattern numbers of the parts "eyes" and"mouth" in the respective face montages (step C8), and transferred to the synthesis memory 41. Thus, the old patterns of the parts "eyes" and "mouth" alone are replaced with the new transferred ones in the synthesis memory 41. Thus, for example, as shown in FIG. 20B, expression changes in the first divination stage are imparted to the X and Y face montages, and the X and Y face montages in the former half stage of the divination are shown (step C9).

If a further predetermined time, for example, of 3 seconds, has elapsed after the X and Y face montages are displayed in the former half stage of the divination, as shown in FIG. 20B (step C10), the respective patterns of the parts "eyes" and "mouth" for the display of the second intermediate stage are read out from the expression part pattern ROM 36 in correspondence to the numbers of the patterns of the parts "eyes" and "mouth" of the respective face montages (step C11) and transferred to the synthesis memory 41. The old patterns of the parts "eyes" and "mouth" alone of the montages are replaced and combined with the new transferred patterns of the parts "eyes" and "mouth" read out in the synthesis memory 41. Thus, expression changes at the second divination stage are imparted to the respective face montages, and the respective X and Y face montages are displayed as the latter half stage of the divination (step C12).

Thereafter, if another predetermined time, for example, of 3 seconds, has elapsed (step C13), the total sum congeniality scores stored in the X and Y total sum score storage areas 12*e*, 12*f* (FIG. 12A) of the congeniality divination montage RAM 40 at step C6 are read out (step C14). Thus, the degree of congeniality between the X and Y is determined by comparison between the total sum scores (step C15). In FIG. 12A, it is determined that X and Y have total sum scores "25" and "21", respectively, and that the difference between X and Y is "4".

If difference between the congeniality total scores of the X and Y montages is determined to be within 0–3, that is, the degree of congeniality between the X and Y is high at step C16, the patterns of the parts "eyes" and "mouth" for display of the result of the coincidence of congeniality and a congeniality coincidence background pattern are read out from the respective areas 36*d* (FIG. 7A) of the expression part pattern ROM 36 in correspondence to the pattern numbers of the parts "eyes" and "mouth" of the respective X and Y face montages (step C17). The congeniality messages "Perfect congenial" and "I am delighted" stored in the congeniality message ROM 38 and corresponding to the score difference "0"-"3" stored in the congeniality message ROM 38 are read out (step C18).

The part patterns as the result of congeniality coincidence of "eyes" and "mouth" corresponding to the respective X and Y face montages and the congeniality coincidence background pattern and read out from the expression part pattern ROM 36 are transferred to the synthesis memory 41. In the synthesis memory 41, the old patterns of the parts "eyes" and "mouth" alone of the X and Y montages are replaced with the new transferred part patterns as the pattern indicative of the result of the congeniality coincidence in the X and Y face montages displayed as the latter half stage of the divination at step C12 and the resulting X and Y face montages are combined with the congeniality coincidence background pattern and the congeniality coincidence messages "Perfect congenial!" and "I am delighted!" read out from the congeniality message ROM 38 (step C19).

Thus, for example, as shown in FIG. 20C, delighted expression changes are imparted to the respective X and Y face montages, and the resulting X and Y face montages are displayed along with the congeniality coincidence background pattern and the congeniality coincidence messages "Perfect congenial!" and the "I am delighted!" on the display 23 (step C20).

If difference between the total congeniality score of the X and Y montages is "4"–"15" at step C21, that is, the degree of congeniality between the X and Y is determined to be common, the basic patterns of the parts "eyes" and "mouth" are again read out from the basic part pattern ROM 33 in correspondence to the pattern numbers of the parts "eyes" and "mouth" of the X and Y face montages (step C22). The common congeniality messages "Almost congenial, aren't we?" and "We will be friends" corresponding to the score difference "4"–"15" stored beforehand in the congeniality message ROM 38 are read out (step C23).

This causes the basic patterns of the parts "eyes" and "mouth" corresponding to each of the X and Y face montages read out from the basic part pattern ROM 33 to be transferred to the synthesis memory 41. In this memory 41, the old patterns of the parts "eyes" and "mouth" alone of the X and Y face montages are replaced with the corresponding transferred ones in the X and Y face montages displayed as the latter half stage of the divination at step C12, and the resulting X and Y montages are synthesized with the common congeniality messages "Almost congenial, aren't we?" and "We will be friends!" read out from the congeniality message ROM 38 (step C24).

Thus, the X and Y basic face montages entered beforehand in the congeniality divination montage RAM 40 are displayed along with the common congeniality messages "Almost congenial, aren't we?" and "We will be friends!" on the display 23 (step C25).

If difference between the X and Y total congeniality scores is not less than "16" at step C21, that is, the degree of congeniality between the X and Y is determined to be low, the patterns of the parts "eyes" and "mouth" for display of the result of the congeniality non-coincidence and a congeniality non-coincidence background pattern are read out from the expression part pattern ROM 36 (FIG. 7B) in correspondence to the pattern numbers of the parts "eyes" and "mouth" of the respective X and Y face montages (step C26).

The congeniality non-coincidence messages "Never congenial!" and "We will fight it out at a battle game!" corresponding to the score difference "16"–"29" stored beforehand in the congeniality message ROM 38 are read out (step C27).

This causes the congeniality non-coincidence result patterns of the parts "eyes" and "mouth" and a congeniality non-coincidence background pattern corresponding to each of the X and Y face montages read out from the expression part pattern ROM 36 to be transferred to the synthesis memory 41. In this memory 41 the old patterns of the parts "eyes" and "mouth" alone of the montages are replaced with the corresponding transferred ones as the congeniality non-coincidence result patterns in the X and Y face montages displayed as the latter half of the divination stage at step C12, and the resulting X and Y montages are combined with the congeniality non-coincidence background pattern and the congeniality non-coincidence messages "Never congenial!" and "We will fight it out at a battle Game!", read out from the congeniality message ROM 38 (step C28).

Thus, the X and Y face montages each are changed so as to have a sad expression, which is displayed along with the congeniality non-coincidence background pattern and the congeniality non-coincidence messages "Never congenial!" and "We will fight it out at a battle Game!" (step C29).

In summary, in the present montage game device, the X and Y montage data for battling purposes or congeniality divining purposes is first entered in the battle montage RAM 39 or the congeniality divination montage RAM 40, and the respective part patterns of the entered X and Y montage data are read out from the basic part pattern ROM 33, and combined in the synthesis RAM 41 and the resulting montages are displayed side by side on The display 23.

In the case of a battle game, battle scores corresponding to the respective part patterns of each of the montages are read out from the battle score ROM 34, the read battle scores are summed for that montage, victory/defeat of X and Y is decided by comparison in magnitude between the battle total scores, and the winner's montage is changed so as to have a delighted expression, which is then displayed along with the victory message on the display 23. The loser's montage is changed so as to have a sad expression, which is then displayed along with a defeat message.

In the case of a congeniality divination game, congeniality scores corresponding to the respective part patterns of each of the montages are read out from the congeniality score ROM 35, the read congeniality scores are summed for that montage, and the degree of congeniality between X and Y is determined by the difference between the X and Y total scores. If the difference is small, the X and Y montages are changed so as to have a delighted expression, and then displayed along with the congeniality coincidence message on the display 23. If the difference is large, the respective X and Y montages are changed so as to have a sad expression, and then displayed along with a congeniality non-coincidence message on the display 23.

By the above-mentioned construction, a battle game in which X and Y battles with each other or a congeniality divination game in which the degree of congeniality between X and Y is divined can be played. The result of battling between X and Y and the degree of congeniality between X and Y can easily be gripped objectively depending on a change in the expression of each montage itself or the displayed contents of a message, and hence a very interesting game is realized.

While the present embodiment is constructed such that the result of battling between X and Y and the degree of congeniality between X and Y are displayed, using the total sums of battle scores or the total sums of congeniality scores (see the score storage areas of FIGS. 4A–5B, 11A–12B) corresponding to the part patterns of the respective montages, the present invention is not limited to that embodiment. Alternatively, arrangement may be such that the result of battling and the degree of congeniality between X and Y is displayed, using the total sum of the pattern numbers of the parts of each of the montages (see the storage areas of the part pattern numbers of FIGS. 11A–12B) as the battle score or the congeniality score.

[Second Embodiment]

Figure 22:
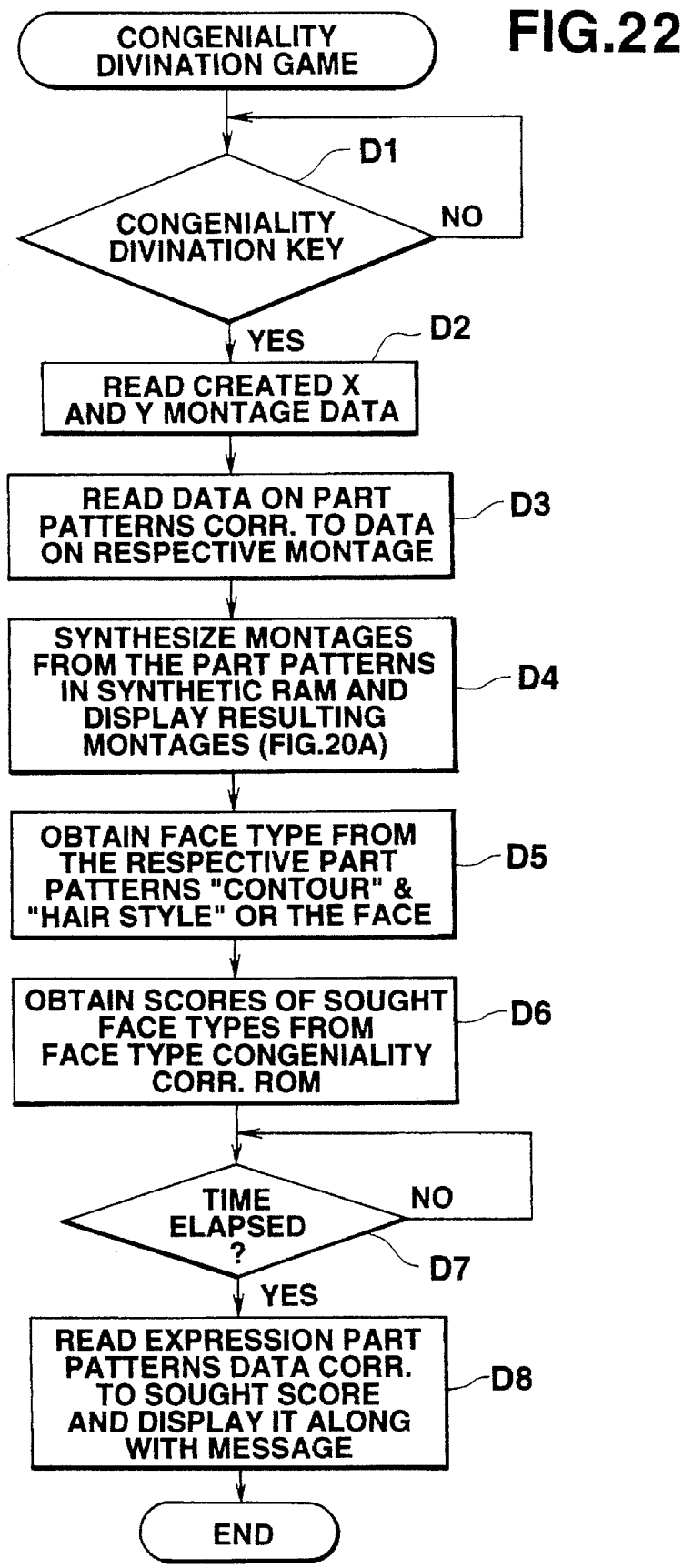
FIG. 22 is a flowchart indicative of a process for playing a congeniality divination game according to the second embodiment.

FIGS. 21 and 22 show a second embodiment of the present invention. In the congeniality divination game in the first embodiment, congeniality scores preset in correspondence to the respective part patterns of each of the X and Y montages are read out from the congeniality score ROM 35, the read congeniality scores are summed for that montage, and the degree of congeniality between X and Y is determined by the difference between the totalized scores. In contrast, the second embodiment is constructed such that in a congeniality divination game congeniality scores are allocated beforehand to all the respective face types of montages, any two congeniality scores are compared and the degree of congeniality between the corresponding montages is determined on the basis of the result of the comparison. The second embodiment also uses the same montage game device as the first embodiment.

FIG. 21 shows a stored state of data in a face type congeniality correspondence ROM used in the second embodiment. The face types of montages are compared using data in the face type congeniality correspondence ROM, and the congeniality between those faces is divined on the basis of the comparison. To this end, a degree of congeniality is preset according to a combination of the X and Y face types in the face type congeniality correspondence ROM.

Also, in the second embodiment, congeniality divination is conducted on the basis of a combination of the face types of montages using a game device similar to that used in the first embodiment.

The congeniality divination game process in this case will be described with respect to FIG. 22.

In this case, it is assumed that X and Y congeniality divination montage data of FIG. 12A which is obtained in the above-mentioned montage creation process (FIGS. 13 and 14) is entered beforehand in the congeniality divination montage RAM 40.

First, when the congeniality divination key 21 is operated at step D1 of FIG. 22, CPU 31 sets the congeniality divination game mode. Thus, the X and Y montage data entered in the congeniality divination montage RAM 40 (FIG. 12A) are read (step D2).

This causes the respective part patterns constituting each of the read X and Y face montages to be read out from the basic part pattern ROM 33 in correspondence to the X and Y face montage data read out from the montage RAM 40 (step D3). The read part patterns are transferred and used to synthesize the X and Y face montages in the synthesis memory 41. Thus, as shown in FIG. 20A, the X and Y face montages are displayed for congeniality divining purposes (steps D3, D4).

After the respective montages are displayed, the receptive face types of the montages are sought from the patterns "contour" and "hair style" of the respective X and Y face montages synthesized in the synthesis RAM 41 at step D5. While the face types (round, elliptic, etc.) can be obtained from the shapes of the patterns "contour" and "hair style" as in the embodiment, similar face types may be stored beforehand for each of the "contour" and "hair style" patterns.

Scores indicative of the degree of congeniality are obtained from the respective areas 200a (FIG. 21) of the face type congeniality correspondence ROM 21 on the basis of a combination of the X and Y face types (step D6). When a combination of X and Y face types is shown in a single circle and a double circle, the scores "0"–"3" are allocated to the combination; when a combination of X and Y face types is shown in a triangle, the scores "4"–"15" are allocated; and when a combination of X and Y face types is shown in a cross, the scores "16" or more are allocated. Thus, when, for example, "round" face types are compared, scores "0"–"3" are allocated to the combination of those face types because this combination is shown by a double circle.

Thereafter, when a predetermined time has elapsed (step D7), part patterns and a message corresponding to an expression which depends on a congeniality score obtained from the face type congeniality correspondence ROM are read out from the expression part pattern ROM 36 and the congeniality message ROM 38 in a process similar to the process at steps C16–C29 of FIG. 19. Thus, the X and Y face montages are displayed, for example, as shown in FIG. 20C (step D8).

While the operation of the battle game or the congeniality divination game in the above embodiments is described as using the X and Y face montages, a battle game and a congeniality divination game similar to those in the above embodiments may be played even when X and Y whole body montages are used.

[Third Embodiment]

Figure 23:
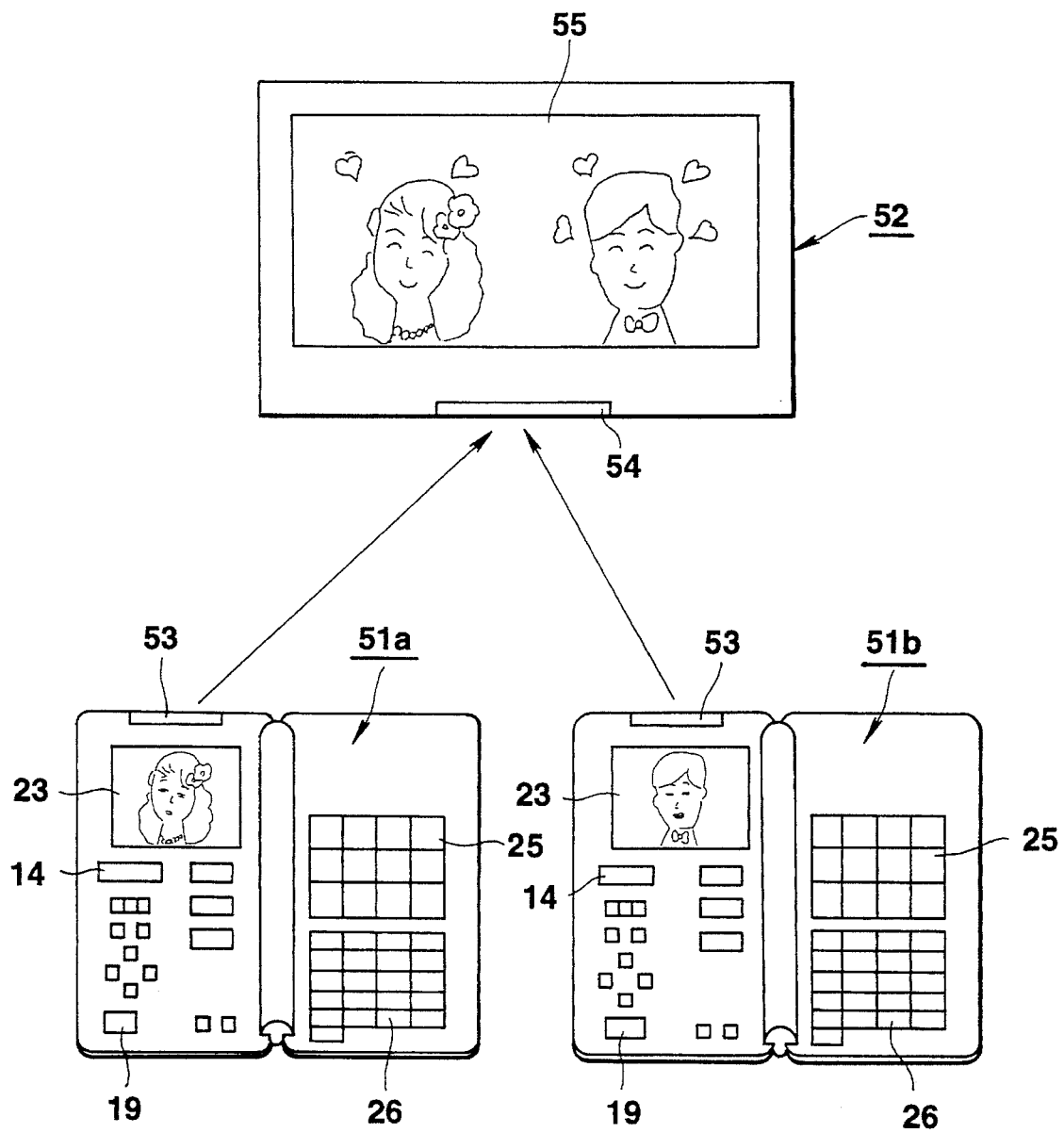
FIG. 23 shows the composition of an internal surface of an infrared optical communication type montage game system as a third embodiment of the present invention and taken when unfolded.
Figure 24:
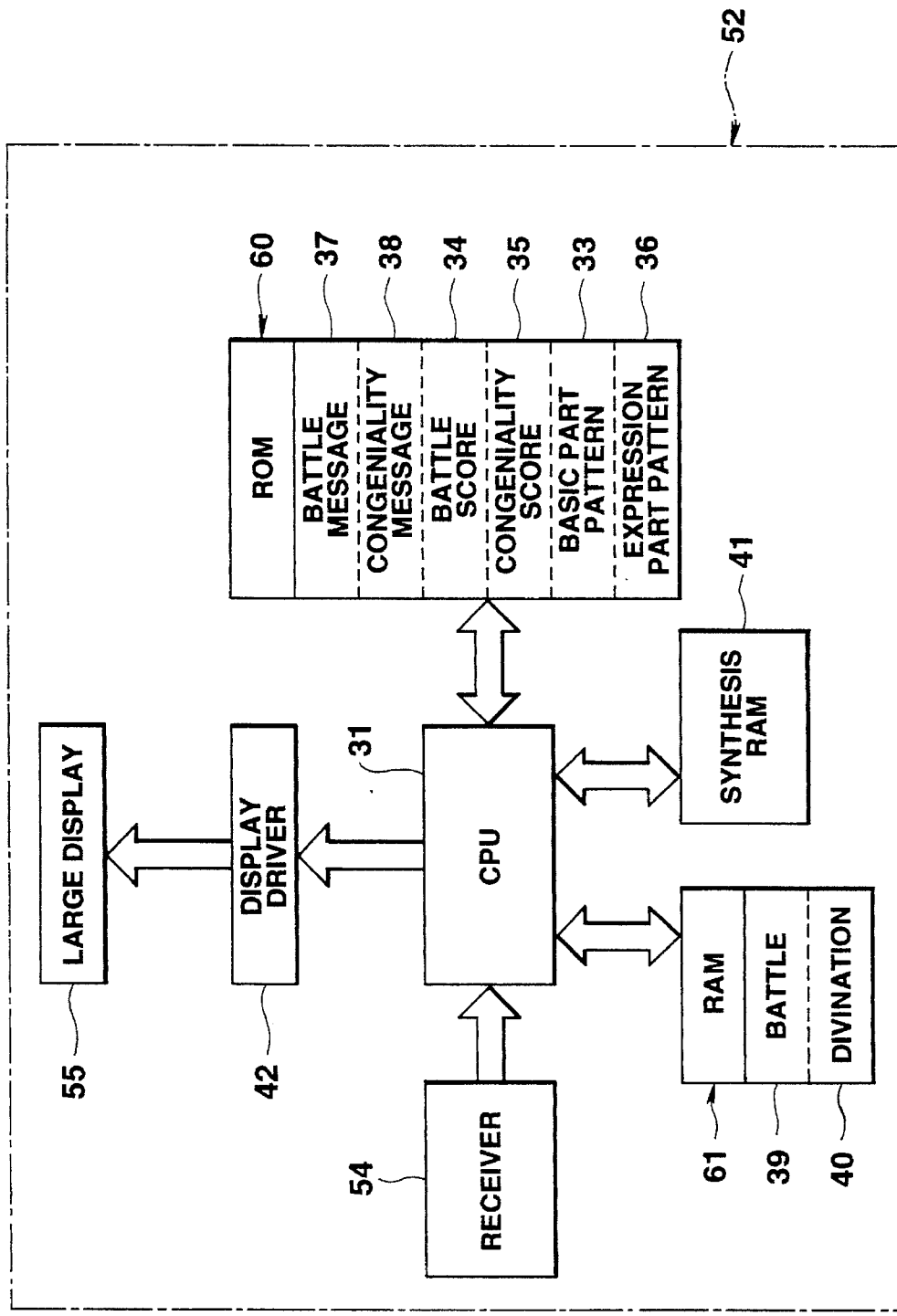
FIG. 24 is a block diagram of an electronic circuit of a large display device of the infrared optical communication type montage game system as the third embodiment.
Figure 25:
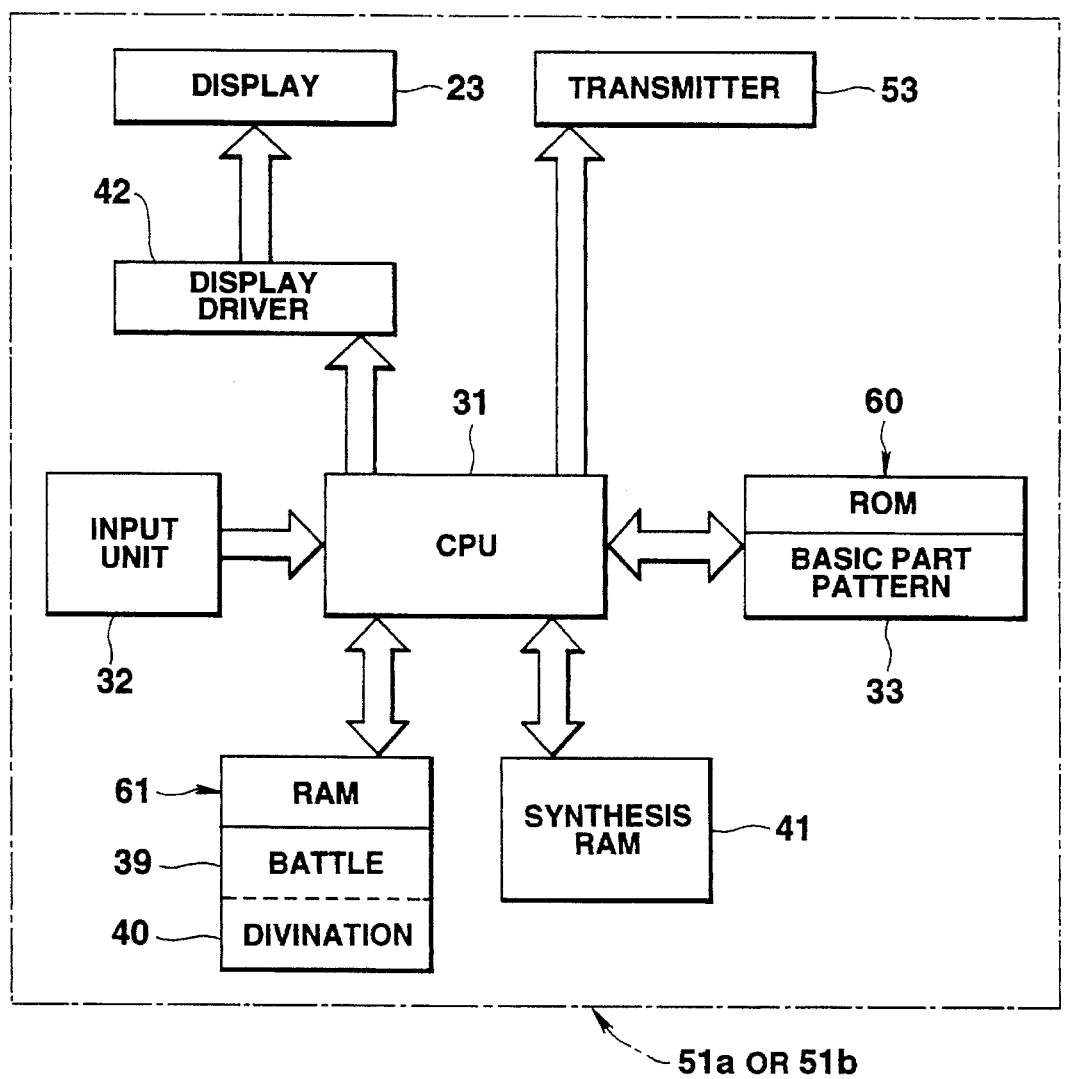
FIG. 25 is a block diagram of an electronic circuit of a game device body of the infrared optical communication type montage game system as the third embodiment.

FIGS. 23–25 show a third embodiment of the present invention. FIG. 23 shows the outer surface structure of an infrared optical communication type montage game system as the third embodiment. FIG. 24 shows the structure of an electronic structure of a large display device used in the game system. FIG. 25 shows the structure of an electronic circuit of a game device body used in the game system. In FIG. 25, only the structure of one of the device bodies 51a, 51b is shown because the device bodies 51a, 51b have the same structure.

In the above respective embodiments, the single game device body 11 creates, enters and displays X-Z montages used when a battle game or a congeniality divination game is played, and performs a battle game process and a congeniality divination game process based on the created montages. In contrast, in the third embodiment, the game device bodies 51a, 51b which the respective users use have the same functions as the game device body 11 of the first and second embodiments. The respective montage data items created and entered by the respective game device bodies 51a, 51b are sent to the large display device 52 and displayed on its large display 55. A battle game and a congeniality divination game similar to those played in the previous embodiments are played on the display device 52. The same reference numeral is used to identify the same element in Figures directed to the present and previous embodiments and further description of the same element will be omitted.

The X-Z battle or congeniality divination montage data created in the respective game device bodies 51a and 51b is entered in a battle montage RAM 39 or a congeniality divination montage RAM 40 provided in the respective game device bodies 51a and 51b. The entered data is sent as an infrared optical signal through a transmitter 53 of the game device bodies to the external large display device 52 where the respective signals are received by a receiver 54 of the display device 52 and then stored in the battle montage RAM 39 or congeniality divination montage RAM 40.

The respective X-Z montage data items stored in the battle montage RAM 39 and congeniality divination montage RAM 40 of the large display device 52 are read out as required by later setting of a battle game mode or a congeniality divination mode. On the basis of the read montage data, the corresponding part patterns are read out from the basic part pattern ROM 33, and used to synthesize montages in the synthesis RAM 41, and the montages are displayed on the large display 55.

Thereafter, when the start key 22, battle key 20 and congeniality divination key 21 of the input unit 32 are operated, the resulting key signals are input through the transmitter 53 to the receiver 54 of the display device 52.

Thus, when the battle game mode is set as in the previous embodiments, the appropriate part patterns are read out from the basic part pattern ROM 33 and the expression part pattern ROM 36 on the basis of data on two target ones of the X-Z respective montages data on which is stored in the montage RAMs 39, 40; predetermined data is read out from the battle score ROM 34 and the battle message ROM 37; and a battle game process is performed using those data items. When the congeniality divination game mode is set, a congeniality divination game process is performed using data on two target ones of the X-Z respective montages stored in the montage RAMs 39, 40, congeniality score ROM 35 and the congeniality message ROM 38 as in the battle game. During the game, data or a signal to be sent from the game device bodies 51a and 51b is input through the transmitter 53 and receiver 54 to the display device 52.

[Fourth Embodiment]

Figure 26:
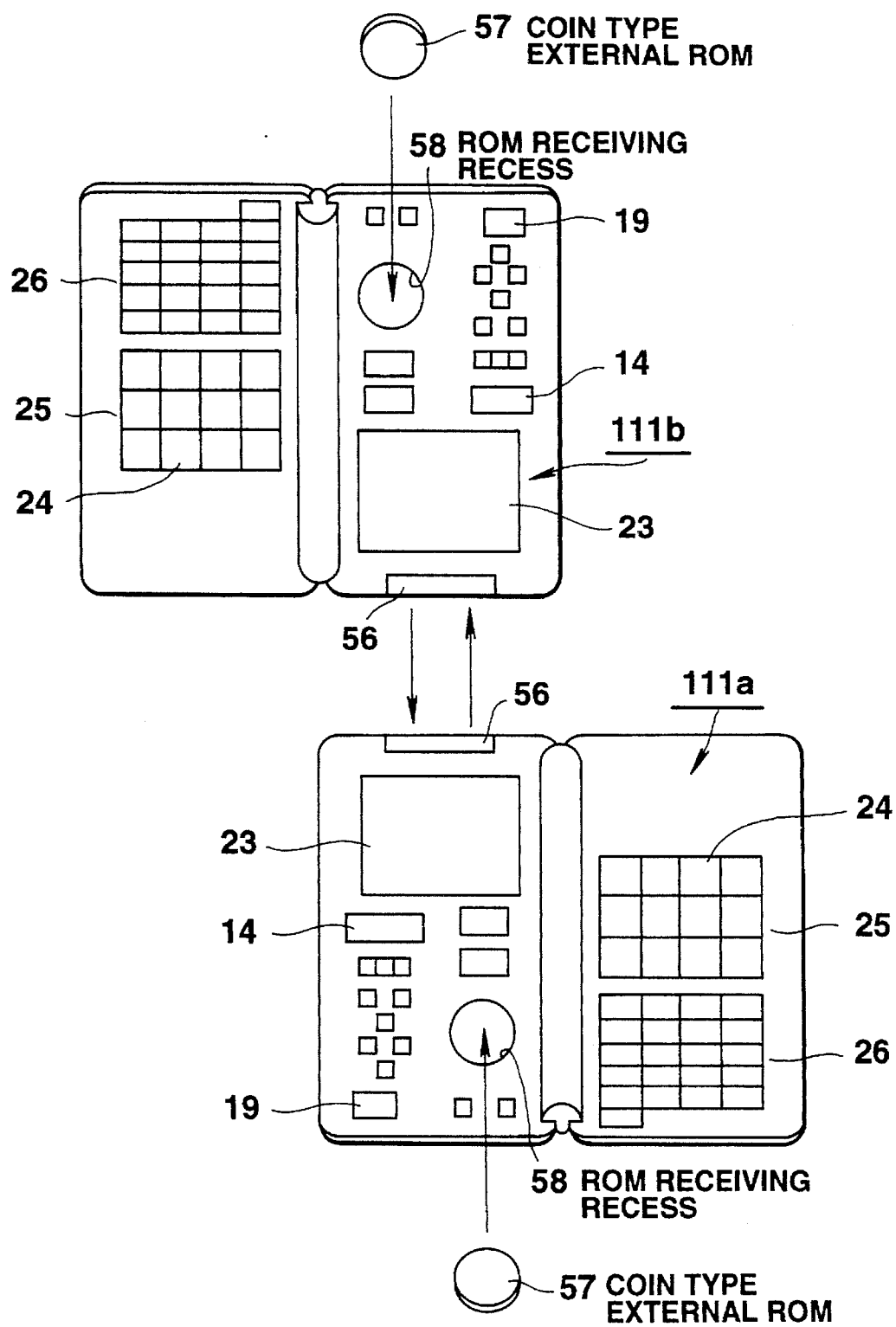
FIG. 26 shows the composition of an internal surface of a montage game system having an infrared optical communication function and a ROM exchange function as a fourth embodiment of the present invention and taken when unfolded.
Figure 27:
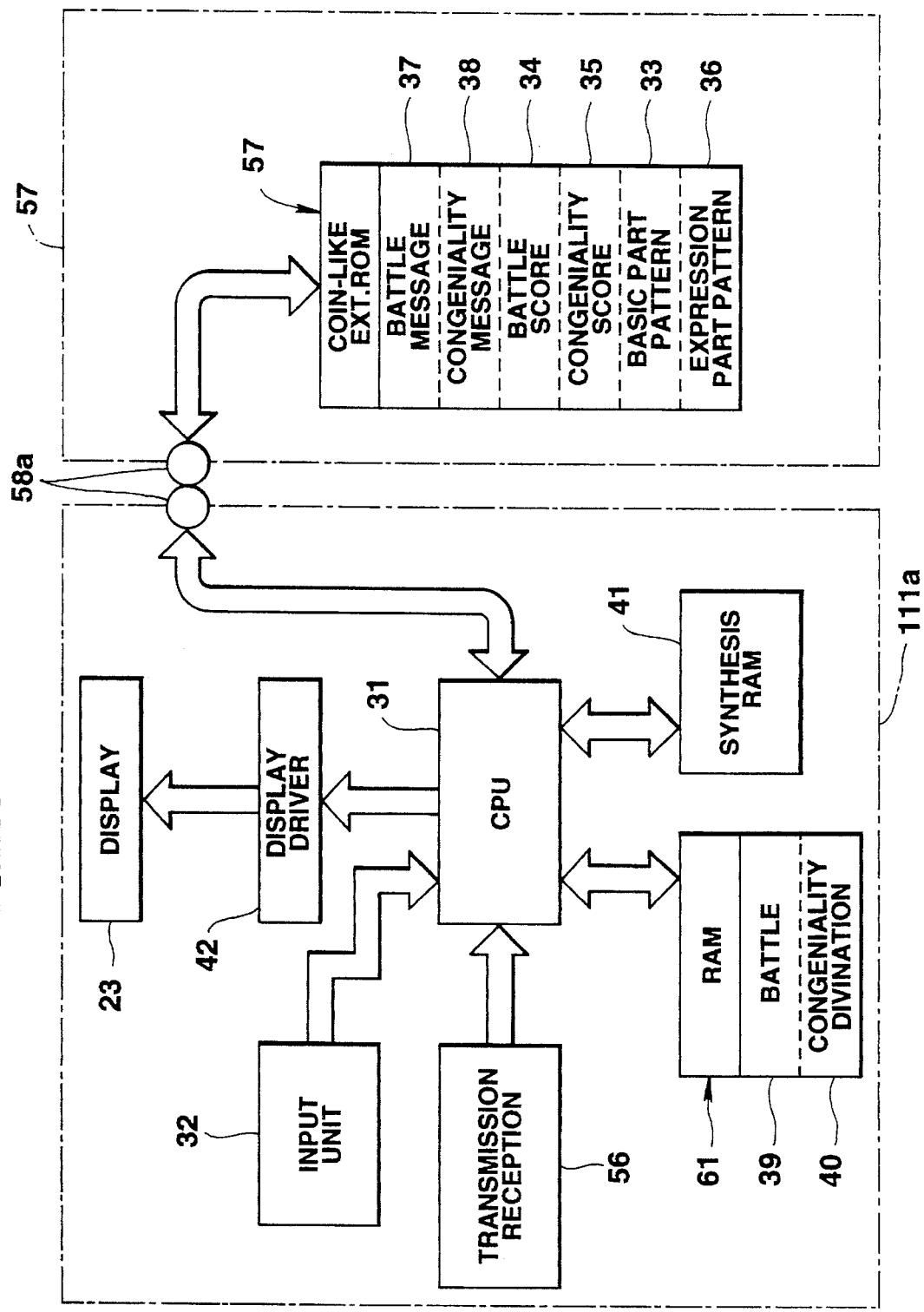
FIG. 27 is a block diagram of an electronic circuit of the montage game system as the fourth embodiment.

FIGS. 26 and 27 show a fourth embodiment of the present invention. FIG. 26 shows an outer surface structure of a montage game system which has the functions of infrared optical communication and ROM exchange. FIG. 27 shows the structure of an electronic circuit of the system. The same reference numeral is used to identify the same element in the Figures directed to the fourth and first embodiments and further description of the element will be omitted.

In the montage game system of the fourth embodiment, and a game device body 111a of one party is adapted to optically send, on infrared rays, montage data created and entered therein through its transmission-reception unit 56 to a transmission-reception unit 56 of a game device body 111b of the other party. The game device body 111a also is adapted to optically receive, using its transmission-reception unit 56, data on the other party's montage sent optically on infrared rays from the transmission-reception unit 56 of the game device device 111b, and to enter the received data in the battle montage RAM 39 and the congeniality divination montage RAM 40 thereof. The system is further adapted to exchange a coin-like external ROM assembly which includes a basic part pattern ROM 33, battle score ROM 34, congeniality score ROM 35, expression part pattern ROM, battle message ROM 37, and congeniality message ROM 38. Entered montage data to be sent may be data on a combination of a part number and a part pattern number or data on respective part pattern numbers following the sequence of part numbers.

According to the montage game system having such functions, the respective montage data items of one party and the other party are transferrable between the game device bodies 111a and 111b of the one and the other party, respectively. Furthermore, a desired one of coin-like external ROMs 57 which have entered therein different montage data items, for example, of the faces of well-known persons is put into the ROM receiving recess 58, and the desired external ROM 57 is connected to the device body 111a through a connection terminal 58a provided in the recess 58. In such state, montage data items different in content and stored in the coin-like external ROM 57 are transmitted between the game device bodies 111a and 111b through the respective transmission-reception units 56. Thus, for example, a battle game or a congeniality divination game can be played using montage data entered by the one party in the respective RAMs 39, 40 of the game device proper 111a and the montage data received from the game device body 111b of the other party and entered in the RAMs 39, 40 of the game device body 111a. Thus, the battle game and the congeniality divination game are further diversified.

While in the embodiments of FIGS. 23–27 the montage data, etc., is transmitted using infrared optical radio communication, montage data, score data, etc., may be transmitted without using the infrared optical communication but using another radio (electric wave) or cable (telephone line) communication.

While in the respective previous embodiments the results of a battle game, etc., are displayed visually using the display device, the present invention is not limited to those embodiments. Alternatively, the intermediate state and result of a game may be printed out using a printing device such as a label printer or a word processor printer.

[Fifth Embodiment]

Figure 28:
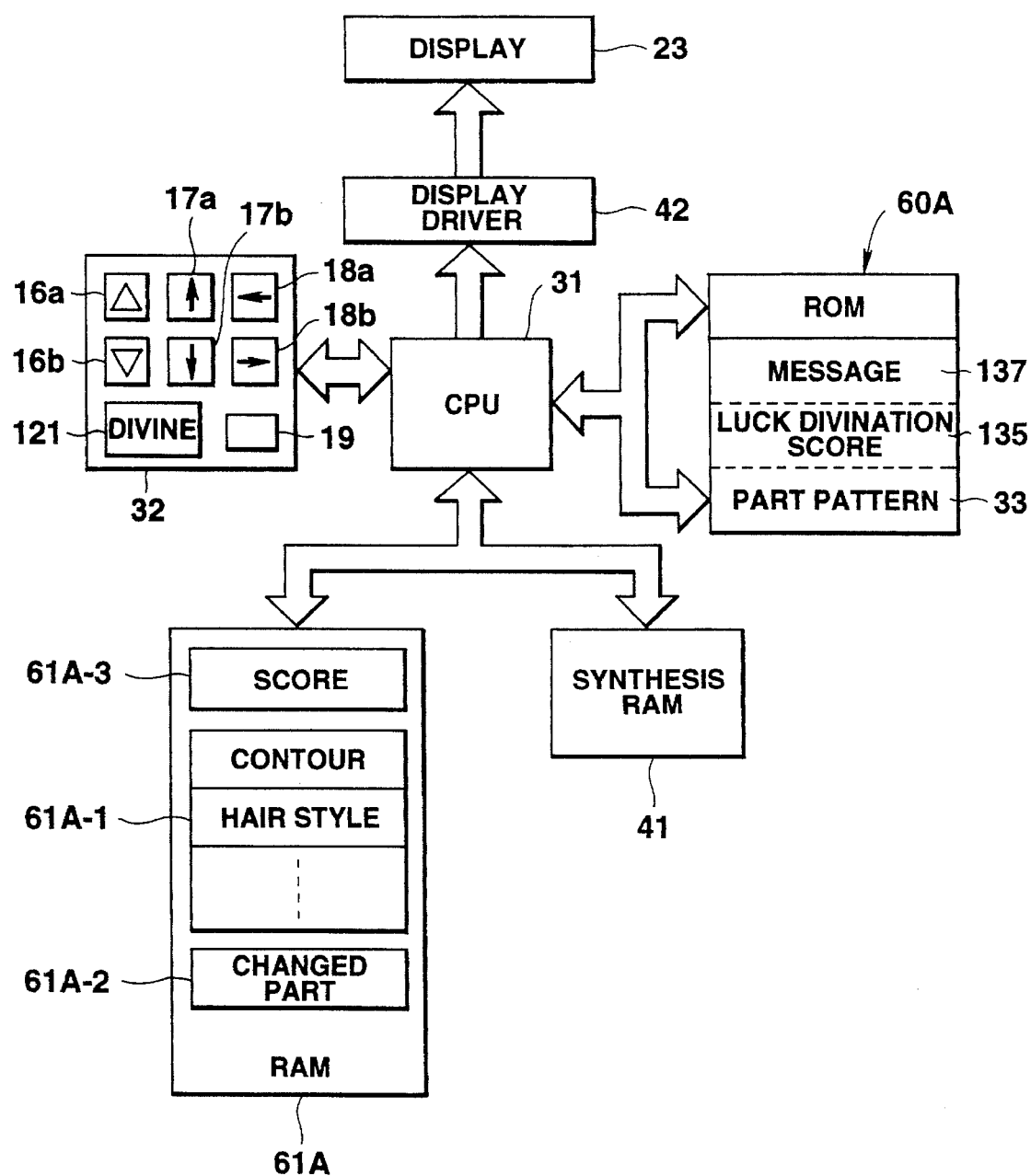
FIG. 28 is a block diagram of an electronic circuit of a montage game system as a fifth embodiment of the present invention.
Figure 31:
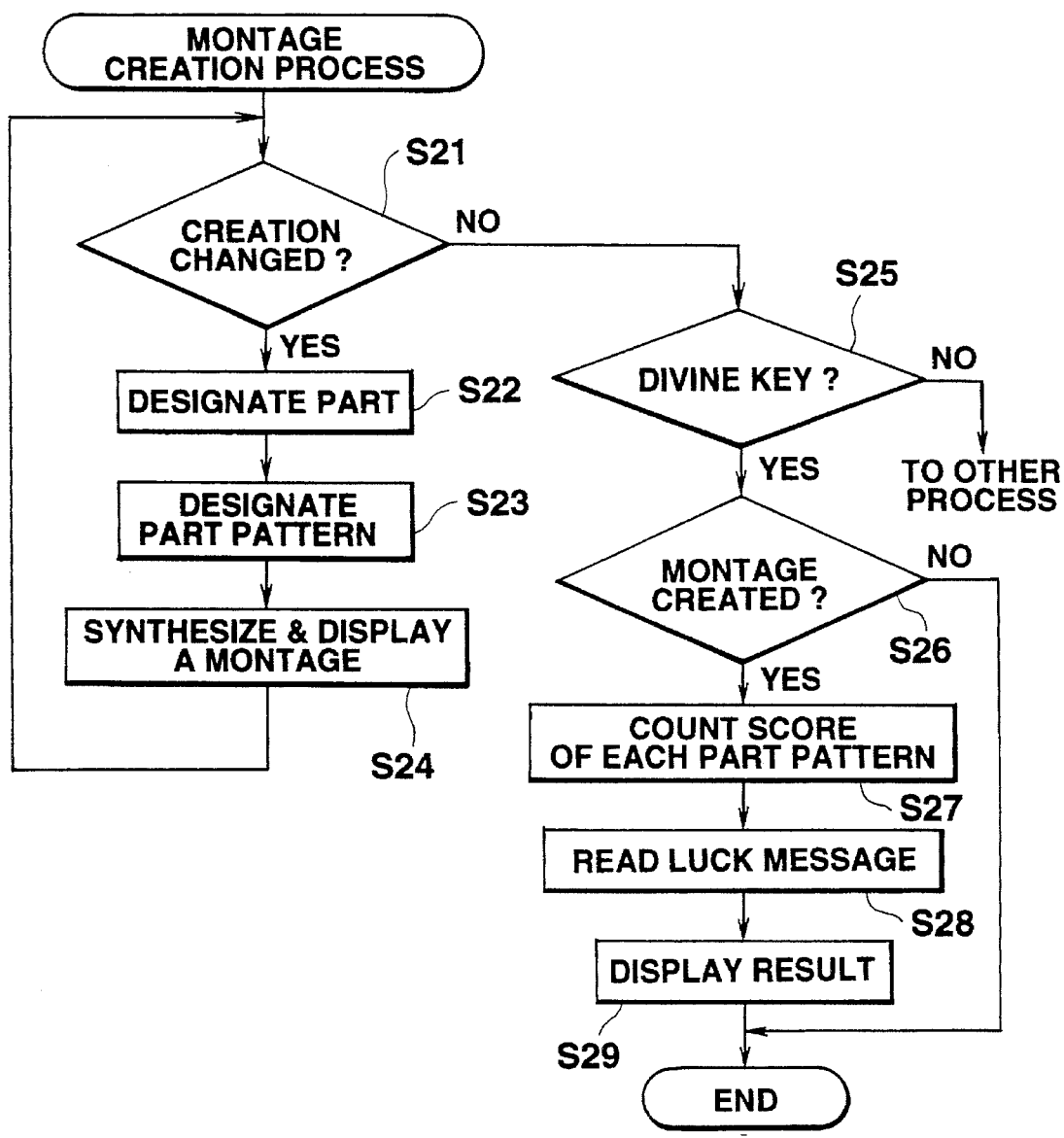
FIG. 31 is a flowchart indicative of a face creating process and a divination process in the fifth embodiment.
Figure 33:
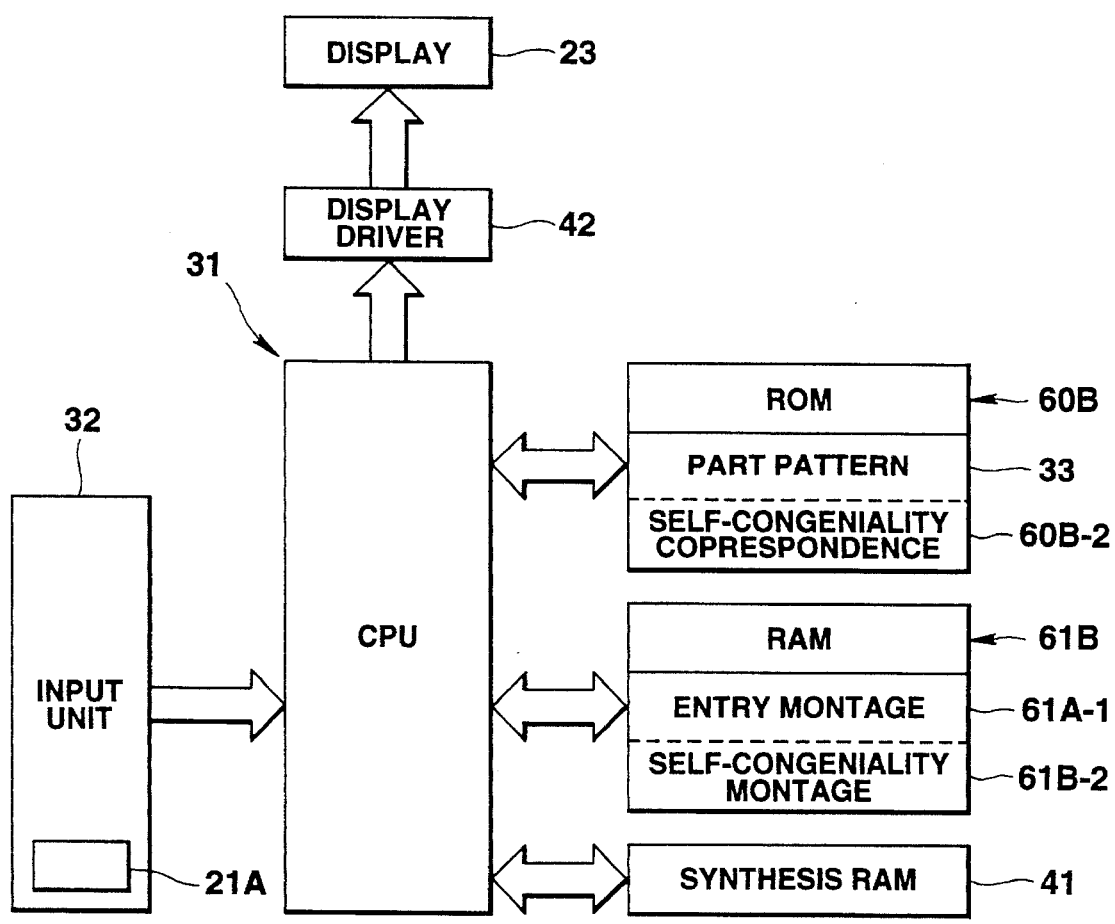
FIG. 33 is a block diagram of an electronic circuit of a montage game system as a sixth embodiment of the present invention.

FIGS. 28 and 31 show a fifth embodiment of the present invention. In FIG. 28, the same reference numeral is used to identify the same element in the Figures directed to the fifth and first embodiments and further description of the element will be omitted.

CPU 31 is connected to an input unit 32, pattern ROM 33, luck divination score ROM 135, message ROM 137, RAM assembly 61A, synthesis RAM 41, display driver 42 and display 23. The scores of luck in work, love, and money preset in correspondence to the respective part patterns stored in the part pattern ROM 33 are stored in the luck divination score ROM 135.

Figures 29, 30, 32:
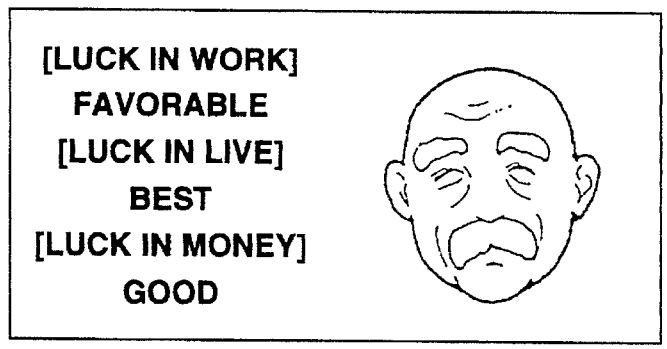
FIG. 29 shows a stored state of luck scores in a score ROM used in the fifth embodiment.
FIG. 30 shows a stored state of luck messages in a message ROM used in the fifth embodiment.
FIG. 32 shows a displayed state of a montage involved in the divination process in the fifth embodiment.

FIG. 29 shows a stored state of luck scores in the luck divination score ROM 135. For example, the score of luck in work corresponding to a storage area "01" of a "contour" part "1" is stored beforehand as "5"; the score of luck in love is stored beforehand as "3"; the score of luck in money is stored beforehand as "2". The score of luck in work corresponding to a storage area "02" of a "hair style" part "2" is stored beforehand as "3"; the score of luck in love is stored beforehand as "3"; the score of luck in money is stored beforehand as "4".

Luck messages which correspond to the respective total sums of the scores of luck in the work, love, and money obtained in correspondence to the respective part patterns constituting a face montage are stored at the corresponding locations of luck in the work, love and money in the message ROM 137.

FIG. 30 shows a stored state of messages on luck in work in the message ROM 137. If the total sum of scores of luck in work obtained in correspondence to the respective part patterns of a face montage is "5"–"10", a luck message "Make twice as many efforts as others" is stored beforehand in the ROM 137; if it is "11"–"20", a luck message "Your luck is improving is stored beforehand; and if it is "21"–"25", a luck message "Best condition" is stored beforehand. Although not shown, messages on luck in the respective love and money are stored beforehand as in the case of the luck in work.

The RAM assembly 61A is provided with a part pattern number RAM 61A-1 which stores the respective pattern numbers of the parts of a montage entered by the user, a change part RAM 61A-2 which stores a part number, and a score RAM 61A-3 which stores the respective total sums of the scores for luck in each of the work, love and money and corresponding to part pattern numbers stored in the part pattern number RAM 61A-1.

The input unit 32 includes part designation keys 17a, 17b; pattern select keys 18a, 18b; an entry key 19; and a divination key 121 which is operated to divine luck in each of the work, love and money for a face montage created and entered. It further includes an ON key; an OFF key; a montage creation key; and a start key corresponding to those in the embodiment of FIG. 1.

The operation of the present montage game device will be described below. FIG. 31 is a flowchart indicative of the creation and divination of a face montage in the montage game device.

When CPU 31 sets the montage creation mode in accordance with the keying-in operation in the input unit 32 (step 21), the part number "1" which indicates that the part is a "contour" is set initially in the change part RAM 61A-2 (step S22). Then, the part pattern number "01" is set initially in the "contour" area of the part pattern number RAM 61A-1 (step S23).

This causes a first pattern of the part "contour" stored in the part pattern ROM 33 to be read out on the basis of the "contour" part pattern number data "01" stored in the part pattern number RAM 61A-1; to be stored in the synthesis RAM 41; and causes the resulting montage to be displayed at a predetermined position on the display 23 (step S24).

The part designation keys 17a, 17b are operated to update sequentially the part numbers designated by the change part RAM 61A-2. The respective part pattern numbers are selected by the pattern select keys 18a, 18b to be set in the respective part areas of the part pattern number RAM 61A-1. This causes CPU 31 to read out the respective patterns of the parts "hair style", "eyebrows", "eyes", "nose", "mouth", etc., stored in the part pattern ROM 33. The synthesis RAM 41 synthesizes from the read patterns face montages, which are then displayed on the display 23 as in the previous embodiments (steps S21–S24).

When the entry key 19 is operated after any face montage is created and displayed, the created face montage data is stored in the part pattern number RAM 61A-1 and the change part RAM 61A-2.

When the divination key is operated to divine the luck of the face montage displayed on the display 23 after the face montage is entered (step S25), CPU 31 ascertains whether the face montage is already entered or now in display (step S26).

If so, data on the respective pattern numbers of the parts of the entered face montage are read out from the part pattern RAM 61A-1 of the RAM assembly 61A. Simultaneously, scores of luck in each of the work, love and money corresponding to the respective part pattern numbers are read out from the luck divination score AROM 135. The respective total sums of the luck scores read out are counted by the operation of CPU 31 and stored in the score RAM 61A-3 of the RAM assembly 61A (step S27).

As described above, when the respective total sums of scores of luck in each of the work, love and money corresponding to the face montage now entered or displayed are obtained in the score RAM 61A-3, the luck messages corresponding to the respective total sums of the luck scores are read out from the message ROM 137 (step S28), and the luck messages are displayed on the display 23 along with the entered face montage, as shown in FIG. 32 (step S29).

According to the present montage game device, scores of luck in work, love and money corresponding to the face montage created and entered or now in display are read out from the luck divination score ROM 135, and summed, and data on the obtained total sums of the luck scores are then stored in the score RAM 61A-3. Thereafter, the respective messages for luck in work, love and money and stored in the message ROM 137 are selectively read out according to the stored total sums of scores for the respective luck items, and displayed on The display 23. Thus, luck divination or physiognomy divination corresponding to the face montage can be performed, using any face montages created by the user.

While the luck scores used in the luck divination are described as the respective total sums of luck scores allocated to the respective part pattern numbers in the present embodiment, they may be predetermined fixed values minus the corresponding values of the luck scores allocated to the respective part pattern numbers, versions of the values of the luck scores allocated to the respective part pattern numbers and, for example, obtained by multiplication, or the total sums of the luck scores allocated to some of the part pattern numbers of a face montage and not to all the part pattern numbers of the face montage.

While in the present embodiment luck or physiognomy divination is shown as being performed on the basis of the face montage, it may be performed on the basis of a whole body montage.

[Sixth Embodiment]

FIGS. 33–37C show a sixth embodiment of the present invention. The same reference numeral is used to identify the same element in the Figures directed to the present and previous embodiments and further description of the element will be omitted.

CPU 31 used in a montage game device of the present embodiment is connected to a ROM assembly 60B, a RAM assembly 61B, an input unit 32, a display driver 42, a display 23 and a synthesis RAM 41.

The ROM assembly 60B includes various control programs for control of CPU 31, a part pattern ROM 33, and a self-congeniality correspondence ROM 60B-2 which stores a table indicative of a relationship in correspondence between each of the part patterns and a part pattern congenial to the former one.

The part pattern ROM 33 of the ROM assembly 60B is a part pattern ROM similar to that of the first embodiment of FIG. 3 and stores in the form of a bit map 50 kinds of part patterns prepared for "contour", "hair style", "eyes", "nose", "mouth", as shown in FIG. 3A

For example, for the "contour" part pattern, an "average face" is stored at address "1" (No. "01"); a "round face" is stored at address "2" ( No. "02" ); . . . . . . ; an "elliptic face" is stored at address "49" (No. "49"); and a "sharp-jawed face" is stored at address "50" (No. "50"). For the hair style part pattern, a "hair style with a flowing hair" is stored at address "01"; a "parted-at-the side hair style" is stored at address "02"; . . . . . . ; a "short-bobbed hair style" is stored at address "50" etc. Part patterns of "eyes", "nose", "mouth", "both legs", etc are stored similarly.

Figure 34A:
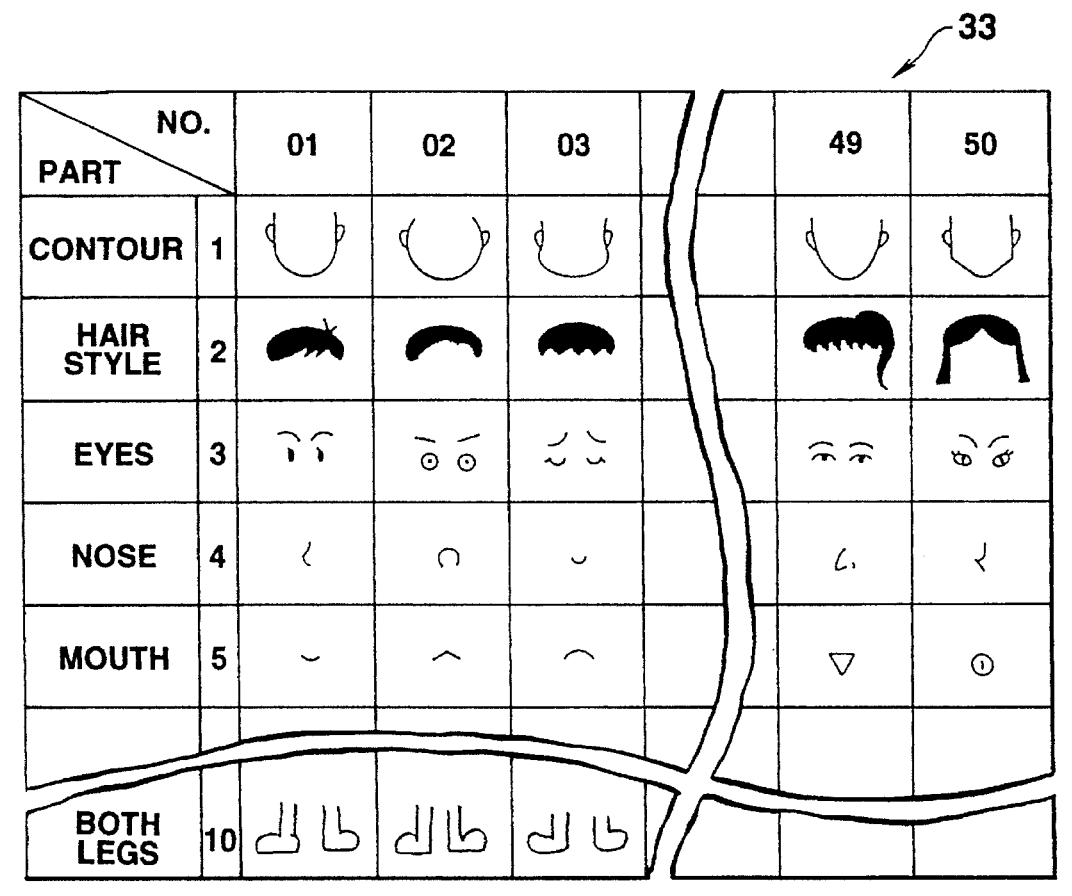

A table of the numbers of part patterns and the numbers of part patterns greatly congenial to the former part patterns are stored in corresponding relationship in the self-congeniality correspondence ROM 60B-2 of the ROM assembly 60B, as shown in FIG. 34B.

For example, in the embodiment of FIG. 34B, No. "03" is stored as the number of a part pattern greatly congenial to a part pattern "contour" having No. "01"; and No. "02" is stored as the number of a part pattern greatly congenial to a part pattern "hair style" having No. "49". Similarly, No. "05" is stored as the number of a part pattern greatly congenial to a part pattern "hair style" having No. "01"; and No. "02" is stored as the number of a part pattern greatly congenial to a part pattern "contour" having No. "49".

Similarly, the part patterns "eyes", "nose", "mouth", . . . "both legs", and part patterns greatly congenial to the corresponding former part patterns are stored with their corresponding part pattern numbers.

The "being congenial" referred to here points out congeniality between the part patterns. In this embodiment, it points out the congeniality between a man and a woman. The congeniality between the part patterns in the self-congeniality correspondence ROM 60B-2 is created on the assumption that, for example, larger "eyes" are greatly congenial to smaller "eyes"; and a lower "nose" is greatly congenial to a lower "nose" although congeniality may be created on the basis of other standards.

The RAM assembly 61B includes an individual data RAM (not shown), an entry montage RAM 61A-1, and a self-congeniality montage RAM 61B-2. The individual data RAM stores individual data such as the names of individuals and their telephone numbers keyed in by the input unit 32. The entry montage RAM 61A-1 stores the numbers of the part patterns of an individual's face and body shape.

For example, as shown in FIG. 35A, a part pattern number group GP1 ("02" as a "contour" part pattern number; "02" as a "hair style" part pattern number; "01" as a "eyes" part pattern number; "01" as a "nose" part pattern number; and "01" as a "mouth" part pattern number) is stored in a first individual entry area "X" of the entry montage RAM 61A-1. A part pattern number group GP2 ("05" as a "contour" part pattern number; "06" as a "hair style" part pattern number; "07" as an "eyes" part pattern number; "08" as a "nose" part pattern number; and "09" as a "mouth" part pattern number . . . ) is stored in a second individual entry area "Y". Similarly, part pattern number Groups each are stored for other individuals.

The self-congeniality montage RAM 61B-2 stores in its storage area the numbers of part patterns corresponding to part patterns which are greatly congenial to part patterns stored in the montage entry storage area.

Figure 35B:
FIG. 35B shows a stored state of congenial part pattern numbers in a self-congeniality montage RAM of the RAM assembly.

For example, as shown in FIG. 35B, the respective part pattern numbers for an "X" montage are: "02" for the "contour", "02" for the "hair style", "01" for the "eyes", "01" for the "nose", "01" for the "mouth", . . . Thus, No. "49" corresponding to No. "2" is stored in a "contour" congeniality part pattern $A_0$ area; No. "49" corresponding to No. "2" is stored in a "hair style" congeniality part pattern $A_1$ area; No. "08" corresponding to No. "01" is stored in an "eyes" congeniality part pattern $A_2$ area; No. "07" corresponding to No. "01" is stored in a "nose" congeniality part pattern $A_3$ area; and No. "10" corresponding to No. "01" is stored in a "mouth" congeniality part pattern $A_4$ area.

Similarly, this applies to "Y": No. "30" corresponding to No. "05" is stored in a "contour" congeniality part pattern $A_0$ area; No. "31" corresponding to No. "06" is stored in a "hair style" congeniality part pattern $A_1$ area; No. "32" corresponding to No. "07" is stored in an "eyes" congeniality part pattern $A_2$ area; No. "33" corresponding to No. "08" is stored in a "nose" congeniality part pattern $A_3$ area; and No. "34" corresponding to No. "09" is stored in a "mouth" congeniality part pattern $A_4$ area.

Similarly, the numbers of the individuals' part patterns and the numbers of part patterns greatly congenial to the former part patterns are stored for the individuals.

Various processes performed by the montage game device of the present embodiment will next be described with respect to a flowchart of FIG. 36.

Figure 37A:
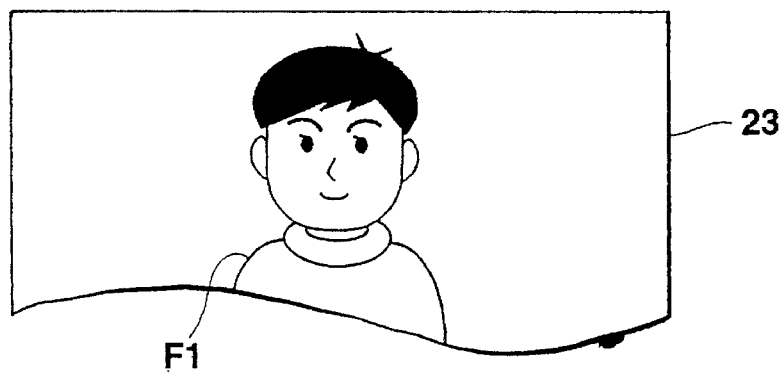
FIG. 37A–37C each show a displayed state of a montage involved in the optimal congeniality montage display process in the sixth embodiment.

In the present embodiment, prior to congeniality divination, a montage creation and entry process is performed to store montage data (the respective pattern numbers of parts) in the entry montage RAM 61A-1. FIG. 37A shows an X montage F1 displayed by the montage creation and entry process, which is similar to that of the first embodiment of FIG. 13 and its further description will be omitted.

Figure 36:
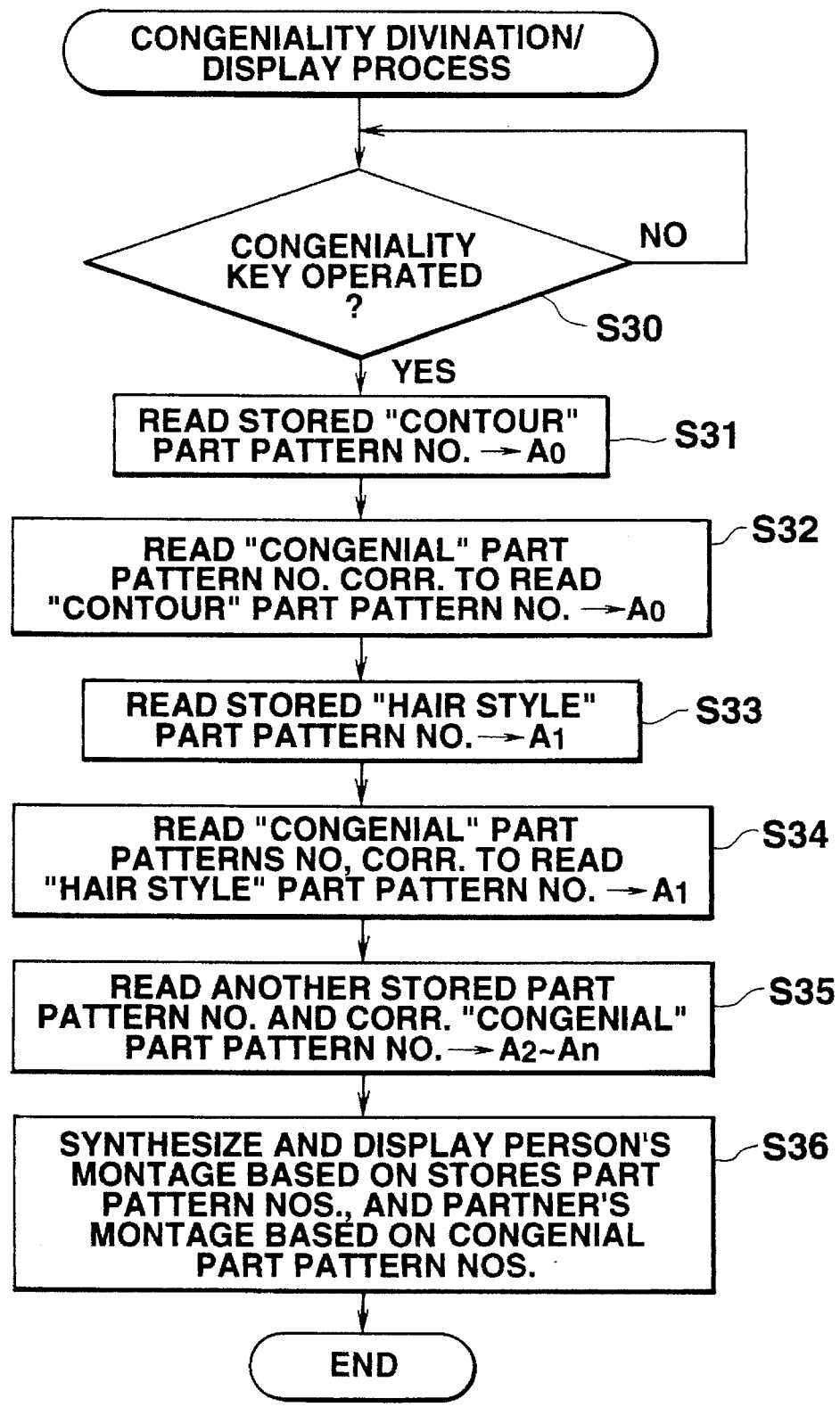
FIG. 36 is a flowchart indicative of an optimal congeniality montage display process in the sixth embodiment.

An optimal congeniality montage display process of the sixth embodiment will be performed on the basis of the flowchart of FIG. 36. This process starts in response to the operation of the congeniality mode select key 32 of the input unit 32.

First, at step S30 it is determined whether the congeniality mode select key 21A is operated. If not, a looping operation is performed until the key 21A is operated.

If so at step S30, control passes to step S31, where, for example, the number "02" of a "contour" part pattern in an entry area "X" where the X data is entered is read out from the entry montage RAM 61A-1 and stored in a column of a "contour" area $A_0$ in the self-congeniality montage RAM 61B-2 and corresponding to the "02".

Control then passes to step S32, where a part pattern number "49" congenial greatly to the "contour" part pattern number "02" read out at step S31 is read out from the self-congeniality montage RAM 61B-2 and stored in a column of an area $A_0$ of the self-congeniality montage RAM 61B-2 and corresponding to the number "49" (FIG. 35B).

Control then passes to step S33, where the "X hair style" part pattern number "2" is read out from the entry montage RAM 61A-1 and stored in a column of the area $A_1$ of the self-congeniality montage RAM 61B-2.

Control then passes to step S34, where a part pattern number "49" congenial to the "hair style" part pattern number "2" read out at step S33 is read out from the self-congeniality montage RAM 60B-2 and stored in a column of an area $A_1$ of the self-congeniality montage RAM 61B-2.

Control then passes to step S35, where the pattern numbers of other parts (eyes, nose, mouth, etc.) of X are read out from the entry montage RAM 61A-1 and stored in respective columns of areas $A_2$–$A_n$ of the self-congeniality montage RAM 61B-2, and congenial part pattern numbers are read out from the self-congeniality montage RAM 61B-2 and stored in respective columns of areas $A_2$–$A_n$ of the self-congeniality montage RAM 61B-2.

Figure 37B:
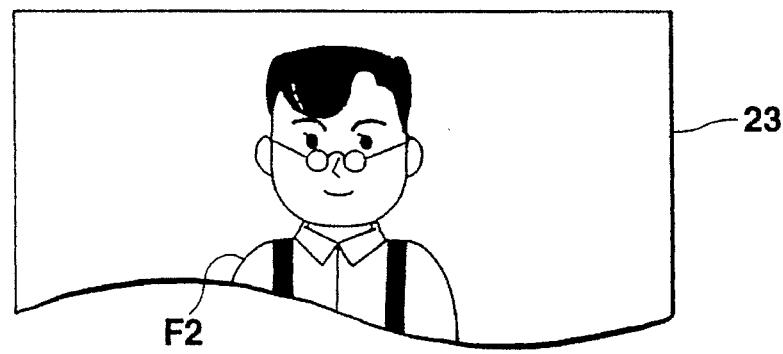
Figure 37C:
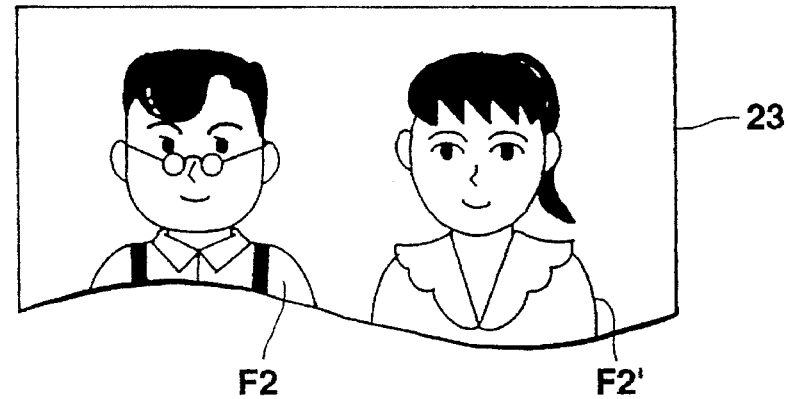

Control then passes to step S36, where part patterns are read out from the part pattern ROM 33 on the basis of the corresponding part pattern numbers stored in the columns of areas $A_0$–$A_n$ of the self-congeniality montage RAM 61B-2 and used to synthesize in the synthesis RAM 41 an X face or whole body montage F2 as one of the target montages. The X montage is then displayed on the display 23, as shown in FIG. 37B. Part pattern numbers are read out from the part pattern ROM 33 on the basis of corresponding congenial part pattern numbers read out from the respective columns of areas $A_0$–$A_n$ of the self-congeniality montage RAM 61B-2 and are used to synthesize in the synthesis RAM 41 a different person's face or whole body montage F2' (in the present embodiment, a female) congenial to the X face or whole body montage F2. The different person's montage is displayed on the display 23, as shown in FIG. 37C. Thus, the series of processes ends.

According to the above processes, a created face or whole body montage and a different face or whole body montage congenial to the former montage (of a man or a female) are displayed. If the montage output device is applied to an electronic pocketbook, for example, it may be used in a manner similar to the congeniality divination. By incorporating elements such as toys mechanically into the pocketbook, the practical value of the pocketbook or the value of the pocketbook as an article of trade is improved.

While in the embodiments the congeniality montage display processes have been described with respect to a person "X", the present invention is not limited to the processes. As long as data on a person is entered in the self-congeniality montage RAM 61B-2, a face or whole body montage of a different person greatly congenial to the former montage can be displayed, of course.

While in the present embodiment description is made in such a manner that the part patterns of a human being as a motif are stored in the part pattern ROM 33, the present invention is not limited to those processes. Part patterns of the face or body of an animal as a motif may be additionally stored in the ROM 33 to display the congeniality between a human being and an animal and between animals.

While in the present embodiment the correlation between part patterns stored in the self-congeniality correspondence ROM 60B-2 has been described as the congeniality between a man and a female, the correlation is not limited to that one, and may be, for example, the congeniality between friends or otherwise that between uncongenial ones to each other.

While in the present embodiment a created face montage, etc., has been described as being displayed on a liquid crystal dot matrix display or the like, the present invention is not limited to the particular case. The created face montage, etc., may be printed out, for example, on a thermosensitive dot printer.

What is claimed is:

1. An image processor comprising:

first setting means in which at least two object images are previously stored, the respective object images each being representative of an object, the respective objects each including plural parts, each of said plural parts having plural part images, the object images each comprising a combination of plural part images each selected from among the plural part images of the respective parts of the object;

second setting means in which plural designating data are stored, said designating data designating the part images composing each of the object images which are stored in said first setting means;

determining means for determining which one of the at least two object images stored in said first setting means wins in a battle between the at least two object images, on the basis of the designating data stored in said second setting means; and result display means for displaying the result of the determination by said determining means.

2. An image processor according to claim 1, further comprising:

first display means for visually displaying the at least two object images stored said first setting means;

second display means for, responsive to the result of the determination by said determining means, changing the at least two object images displayed on said first display means to other object images which are different in shape from the object images previously displayed on said first display means, and for visually displaying the changed object images thereon.

3. An image processor according to claim 2, wherein said determining means comprises:

object image data selecting means for selecting two object images, which are determined with respect to win or failure in a battle, from the plurality of object images stored in said first setting means; and win/failure determining means for determining which one of the two object images selected by said object image data selecting means wins on the basis of the respective part images which comprises the two object images.

4. An image processor according to claim 2, wherein the designating data stored in said second setting means comprises a total sum of scores allocated to the respective part images of each of the object images.

5. An image processor according to claim 2, wherein said first and second setting means comprise:

multiple-part designation means for designating respective parts of the object;

image storage means for storing an object image comprising a combination of part images for parts designated by said multiple-part designating means; and part image storage means for storing part images which comprise an object image stored in said image storage means;

transmission means for transmitting by radio the respective part images stored in said part image storage means;

wherein said determining means comprises receiving means for receiving the respective part images comprising an object image transmitted externally by radio; and win/failure determining means for determining which one of the object images wins in a battle between any two object images on the basis of the respective part images received by said receiving means and the respective part images stored in said part image storage means.

6. An image processor according to claim 1, wherein said result display means comprises:

message data storage means for storing a plurality of message data, the message data corresponding respectively to the results of the determination by said determining means;

message data display means for visually displaying one of the message data stored in said message data storage means, in accordance with the result of the determination by said determining means.

7. An image processor according to claim 1, further comprising:

first display means for visually displaying the object images stored in said first setting means;

second display means for changing the object images displayed on said first display means to other object images different in shape, and for visually displaying said other object images changed in shape; and third display means for visually displaying still another object images which are different in shape from the object images respectively displayed on said first and second display means after the object images are displayed on said first display means and before said other object images are displayed on said second display means.

8. An image processor according to claim 1, wherein said first setting means comprises:

part image storage means for storing a plurality of part images of each of the parts of the object;

designation means for designating for each part of the object one of the part images stored in said part image storage means; and object image data storage means for storing data corresponding to an object image which comprises a combination of part images of respective parts designated by said designation means.

9. An image processor according to claim 1, further comprising:
receiving means for receiving two sets of part images which comprise two corresponding object images sent externally by radio;
win/failure determining means for determining which one of the object images wins in a battle between any two object images, on the basis of the corresponding two sets of part images received by said receiving means; and
determination result display means for displaying the result of the determination by said win/failure determining means.

10. An image processor according to claim 9, further comprising:
object image display means for displaying two object images each comprising a combination of two sets of part images received by said receiving means.

11. An image processor comprising:
first setting means in which at least two object images are previously stored, the respective object images being representative of an object, the respective objects each including plural parts, each of said plural parts having plural part images, the object images each comprising a combination of plural part images each selected from among the plural part images of the respective parts of the object;
second setting means in which plural designating data are stored, said designating data designating the part images composing each of the object images which are stored in said first setting means;
determining means for determining a congeniality between the at least two object images stored in said first setting means on the basis of the designating data stored in said second setting means; and
result display means for displaying the result of the determination by said determining means.

12. An image processor according to claim 11, further comprising:
first display means for visually displaying the at least two object images stored said first setting means; and
second display means for, responsive to the result of the determination by said determining means, changing the at least two object images displayed on said first display means to other object images which are different in shape from the object images previously displayed on said first display means, and for visually displaying the changed object images thereon.

13. An image processor according to claim 11, wherein said result display means comprises:
message data storage means for storing a plurality of message data, the message data corresponding respectively to the results of the determination by said determination means; and
message data display means for visually displaying one of the message data stored in said message data storage means, in accordance with the result of the determination by said determining means.

14. An image processor according to claim 11, further comprising:
first display means for visually displaying the object images stored in said first setting means;

second display means for changing the object images displayed on said first display means to other object images different in shape, and for visually displaying the said other object images changed in shape; and
third display means for visually displaying still another object images which are different in shape from the object images respectively displayed on said first and second display means after the object images are displayed on said first display means and before said other object images are displayed on said second display means.

15. An image processor according to claim 11, wherein said first setting means comprises:
part image storage means for storing a plurality of part images of each of the parts of the object;
designation means for designating for each part of the object one of the part images stored in said part image storage means; and
object image data storage means for storing data corresponding to an object image which comprises a combination of part images of respective parts designated by said designation means.

16. An image processor according to claim 11, wherein said determining means comprises:
object image data selecting means for selecting two object images to be determined with respect to congeniality from a plurality of object images stored said first setting means; and
congeniality determining means for determining a congeniality between the two object images selected by said object image data selecting means on the basis of the respective part images which comprise the two object images.

17. An image processor according to claim 11, wherein the designating data stored in said second setting means comprises a total sum of scores allocated to the respective part images of each of the object images.

18. An image processor according to claim 11, wherein said first and second setting means comprise:
multiple-part designation means for designating respective parts of the object;
image storage means for storing an object image comprising a combination of part images for parts designated by said multiple-part designating means; and
part image storage means for storing part images which comprise an object image stored in said image storage means;
transmission means for transmitting by radio the respective part images stored in said part image storage means;
wherein said determining means comprises receiving means for receiving the respective part images comprising an object image transmitted externally by radio; and
congeniality determining means for determining a congeniality between any two object images, on the basis of the respective part images received by said receiving means and the respective part images stored in said part image storage means.

19. An image processor according to claim 11, further comprising:
receiving means for receiving two sets of part images which comprise two corresponding object images sent externally by radio;
congeniality determining means for determining the congeniality between any two object images, on the basis of the corresponding two sets of part images received by said receiving means; and determination result display means for displaying the result of the determination by said congeniality determining means.

20. An image processor according to claim 11, further comprising:

object image display means for displaying two object images each comprising a combination of two sets of part images received by said receiving means.

21. An image processor, in which an object includes plural parts, each of said plural parts having plural part images, and an object image of an object is represented by a combination of part images each selected from among plural part images of the respective parts of the object, the image processor comprising:

part image storage means for storing a plurality of part images of the parts the object;

part designating means for designating one of the parts of the object to select a part image from among the plural part images thereof;

object image creating means for reading out the part image of the part of the object selected by said part designating means from said part image storage means, and for combining a plurality of read out part images to create at least two object images;

designating data storage means for storing in combination designating data for designating the part images included in the respective object images created by said object image creating means;

object image display means for displaying the object images created by said object image creating means;

determining means for making a decision on either of congeniality and battle between the two object images displayed on said object image display means, based on the designation data stored in said designating data storage means; and display control means for at least partially changing at least one of the two object images displayed on said object image display means, in response to the decision made by said determining means, and for displaying the object image which is at least partially changed.

22. An image processor, in which an object includes plural parts, each of said plural parts having plural part images, and an object image of an object is represented by a combination of part images each selected from among plural part images of the respective parts of the object, the image processor comprising:

designating means for designating parts of a first object;

first part image storage means, for beforehand storing a plurality of part images of the respective parts of the object;

second part image storage means for beforehand storing second part images corresponding to first part images constituting a first object image;

reading means for reading out from said first part storage means first part images corresponding to the parts of the designated first object in response to the designation of the parts of the first object by said designating means, and for reading out from said second part storage means second part images corresponding to the read first part images; and display means for displaying the first and second object images on the basis of the first and second part images read out by said reading means.

23. An image processor, in which an object includes plural parts, each of said plural parts having plural part images, and an object image of an object is represented by a combination of part images each selected from among plural part images of the respective parts of the object, the image processor comprising:

designating means for designating parts of an object;

part image storage means for storing part images indicative of the parts of the object designated by said designating means;

score storage means for storing scores corresponding respectively to the parts of the object;

score calculating means for reading out from said score storage means scores corresponding to the parts designated by said designating means, and for calculating a total sum of the scores;

message storage means for storing a message corresponding to the total sum of the scores; and display means for displaying an object image on the basis of corresponding data stored in said part image storage means, for reading a message stored in said message storage means depending on the total sum of scores calculated by said score calculating means, and for displaying the read message.

24. An image processor according to claim 23, wherein:

said message storage means stores a plurality of kinds of messages, each message corresponding to a total sum of the score; and said display means displays an object image on the basis of a corresponding part image stored in said data storage means, reads a plurality of messages stored in said message storage means depending on the total sum of scores calculated by said score calculating means, and displays the read plurality of messages.

25. A congeniality divination apparatus comprising:

setting means in which at least two object images and divination data of said at least two object images are set previously;

divination means for practicing divination on congeniality between the at least two object images set in said setting means by the divination data thereof set in said setting means; and displaying means for partially changing the at least two object images set in said setting means based on the result of the divination practiced by said divination means, and for displaying the partially changed object images.

26. The congeniality divination apparatus according to claim 25, wherein:

the object images set in said setting means each comprise a combination of plural part images, each part image bearing a score; and the divination data set in said setting means comprises numeral data, each numeral data representing a total of scores of part images included in corresponding object image; and said divination means practices divination on congeniality between the at least two object images by the numeral data.

27. The congeniality divination apparatus according to claim 25, further comprising:

a message memory for storing plural messages corresponding respectively to results of the divination practiced by said divination means; and wherein:

said displaying means comprises means for partially changing the at least two object images set in said setting means based on the result of the divination practiced by said divination means, and for displaying the partially changed object images; and means for reading out from said message memory a message corresponding to the result of the divination practiced by said divination means and for displaying the read out message together with the displayed object images.

28. A congeniality divination apparatus comprising:

composing means for composing at least two object images on which congeniality divination is to be practiced;

a divination data memory for storing divination data corresponding respectively to the object images composed by said composing means, the divination data being used for congeniality divination;

object image display means for displaying the object images composed by said composing means;

divination practicing means for practicing divination on congeniality between the at least two object images displayed on said object display means by the divination data stored in said divination data memory; and result display means for displaying a result of the divination practiced by said divination practicing means.

29. The congeniality divination apparatus according to claim 28, further comprising:

change image display means for partially changing the at least two object images displayed on said object image display means based on the result of the divination practiced by said divination practicing means, and for displaying the partially changed object images.

30. An image processor comprising:

first setting means for setting a first object image including plural part images, each of said plural part images having respective part-image designating data;

a memory for storing plural combination data, each including a part image and part-image designating data thereof;

receiving means for receiving a part-image designating data externally transmitted thereto;

second setting means for reading out from said memory a part image corresponding to the part-image designating data received by said receiving means, and for combining plural read out part images to set a second object image;

judging means for making a decision on either of congeniality and battle of the second object image set by said second setting means to the first object image set by said first setting means, based on part-image designating data corresponding respectively to part images included in the first and second object images; and display means for displaying the decision made by said judging means.

* * * * *